United States Patent
Teng et al.

(10) Patent No.: US 11,090,564 B1
(45) Date of Patent: Aug. 17, 2021

(54) USING SENSOR STATISTICS FOR PLAYER AUTHENTICATION

(71) Applicant: QUALCOMM Incorporated, San Diego, CA (US)

(72) Inventors: Diyan Teng, Santa Clara, CA (US); Mehul Soman, Sunnyvale, CA (US); Shashank Narayanan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/793,963

(22) Filed: Feb. 18, 2020

(51) Int. Cl.
*A63F 13/20* (2014.01)
*A63F 13/71* (2014.01)
*A63F 13/22* (2014.01)

(52) U.S. Cl.
CPC .............. *A63F 13/71* (2014.09); *A63F 13/22* (2014.09)

(58) Field of Classification Search
CPC .......... A63F 13/20; A63F 13/21; A63F 13/70; A63F 13/77; A63F 13/79; A63F 2300/401; A63F 2300/532; G06F 21/316; G06F 21/32; G06F 21/34; G06F 21/51; G06F 21/566; H04N 21/4415; H04L 29/06755

See application file for complete search history.

(56) References Cited

U.S. PATENT DOCUMENTS

2020/0194008 A1\* 6/2020 Lee .......................... G06F 3/167
2020/0279455 A1\* 9/2020 Zavesky ................. A63F 13/79

\* cited by examiner

*Primary Examiner* — Omkar A Deodhar
(74) *Attorney, Agent, or Firm* — Qualcomm Incorporated

(57) ABSTRACT

Methods, systems, and devices for using sensor statistics for player authentication are described. A device or system (e.g., a video game, an electronic sports (Esports) system, a gaming console, etc.) may utilize sensors to authenticate a player (e.g., a user) to an account during gameplay (e.g., in real-time during gameplay). Users may be authenticated by matching sensed gameplay attributes (e.g., indicators, reflex time, sensed patterns, eye motion, heart rate, tremors, frequency of operation, periodicity, spiky behavior, eye concentration, etc.) to the account. For example, collected sensor data may be compared to the account's history or past sensor data, or may be compared to similar ranked players' sensor data, for authentication. The device or system may further use additional data including robot (e.g., BOT) gameplay data, sensor data collected from other players of different (e.g., higher) rank, etc. to identify when collected sensor data may be associated with inauthentic gameplay.

19 Claims, 10 Drawing Sheets

USING SENSOR STATISTICS FOR PLAYER AUTHENTICATION

BACKGROUND

The following relates generally to user authentication, and more specifically to using sensor statistics for player authentication.

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, display devices, and gaming devices. The expansive use of multimedia systems has influenced advances made to computer-related technologies, such as online gaming. Computer systems have increasingly become an integral part of the business world and the activities of individual consumers. Computer systems may be used to carry out several business, industry, and academic endeavors.

The use of computers and mobile devices has caused an increased presence in online gaming and gaming tournaments. Some user authentication systems may rely on user credentials to verify user authenticity. However, in some cases, verifying a user based on user credentials may yield false or otherwise incorrect user authenticity. For example, user credentials may be used shared, stolen, faked, or otherwise used to falsely authenticate a user.

SUMMARY

The described techniques relate to improved methods, systems, devices, and apparatuses that support using sensor statistics for player authentication. Generally, the described techniques provide for improving player authentication in gaming systems. A device or system (e.g., a video game, an electronic sports (Esports) system, a gaming console, etc.) may utilize sensors to authenticate a player (e.g., a user) to an account during gameplay (e.g., continuously or periodically in real-time during gameplay). Users may be authenticated by matching sensed gameplay attributes (e.g., indicators, reflex time, sensed patterns, eye motion, heart rate, tremors, frequency of operation, periodicity, spiky behavior, eye concentration, etc.) to the account. For example, collected sensor data may be compared to the account's history or past sensor data, or may be compared to similar ranked players' sensor data. The video game or Esports system may further use additional data (e.g., a second set of gameplay attributes) including robot (e.g., BOT) gameplay, sold/transferred accounts, sensor data collected from other players of different (e.g., higher) rank, etc. to identify when information collected by the controller sensors may be associated with inauthentic gameplay.

The described techniques may include identifying a first set of gameplay attributes that are associated with a user account. The first set of gameplay attributes may include data associated with gameplay, and the data may be collected via hardware components, software components, of a combination thereof. The described techniques may include identifying a second set of gameplay attributes associated with inauthentic input. The second set of gameplay attributes may include data associated with potential inauthentic game play, such as gameplay attributes associated with automated or BOT gameplay, other users gameplay (e.g., other users of higher level, such as potential account boosters), etc. During an interactive gameplay session, one or more user input attributes of a user may be monitored (e.g., via a sensor on an input device), and the monitored user input attributes may be compared to the first set of gameplay attributes (e.g., for authentication) and the second set of gameplay attributes (e.g., for detecting inauthentic gameplay).

A method of user authentication is described. The method may include identifying a first set of gameplay attributes associated with a user account, identifying a second set of gameplay attributes associated with inauthentic input, monitoring, via a sensor on an input device, one or more user input attributes of a user during an interactive gameplay session, comparing the one or more user input attributes of the user to the first set of gameplay attributes, the second set of gameplay attributes, or both, and determining whether the user is an authentic user of the user account based on the comparison.

An apparatus for user authentication is described. The apparatus may include a processor, memory coupled with the processor, and instructions stored in the memory. The instructions may be executable by the processor to cause the apparatus to identify a first set of gameplay attributes associated with a user account, identify a second set of gameplay attributes associated with inauthentic input, monitor, via a sensor on an input device, one or more user input attributes of a user during an interactive gameplay session, compare the one or more user input attributes of the user to the first set of gameplay attributes, the second set of gameplay attributes, or both, and determine whether the user is an authentic user of the user account based on the comparison.

Another apparatus for user authentication is described. The apparatus may include means for identifying a first set of gameplay attributes associated with a user account, identifying a second set of gameplay attributes associated with inauthentic input, monitoring, via a sensor on an input device, one or more user input attributes of a user during an interactive gameplay session, comparing the one or more user input attributes of the user to the first set of gameplay attributes, the second set of gameplay attributes, or both, and determining whether the user is an authentic user of the user account based on the comparison.

A non-transitory computer-readable medium storing code for user authentication is described. The code may include instructions executable by a processor to identify a first set of gameplay attributes associated with a user account, identify a second set of gameplay attributes associated with inauthentic input, monitor, via a sensor on an input device, one or more user input attributes of a user during an interactive gameplay session, compare the one or more user input attributes of the user to the first set of gameplay attributes, the second set of gameplay attributes, or both, and determine whether the user is an authentic user of the user account based on the comparison.

In some examples of the method, apparatuses, and non-transitory computer-readable medium described herein, determining whether the user may be the authentic user of the user account may include operations, features, means, or instructions for determining the user may be the authentic user of the user account based on matching the one or more user input attributes to at least a subset of the first set of gameplay attributes, where the one or more user input attributes include a monitored reflex time, a monitored eye motion, a monitored heart rate, a monitored gameplay pattern, or any combination thereof.

In some examples of the method, apparatuses, and non-transitory computer-readable medium described herein, determining whether the user may be the authentic user of the user account may include operations, features, means, or instructions for determining the user may be an inauthentic user of the user account based on matching the one or more user input attributes to at least a subset of the second set of gameplay attributes, where the one or more user input attributes include a monitored reflex time, a monitored eye motion, a monitored heart rate, a monitored gameplay pattern, or any combination thereof.

Some examples of the method, apparatuses, and non-transitory computer-readable medium described herein may further include operations, features, means, or instructions for identifying at least one user input attribute of the one of the one or more user input attributes differ from the first set of gameplay attributes by a threshold based on the comparison, where the user may be determined to be an inauthentic user of the user account based on the identified at least one user input attribute. In some examples of the method, apparatuses, and non-transitory computer-readable medium described herein, the at least one user input attribute includes a monitored gameplay pattern, a monitored frequency of operation, a monitored player rank, a monitored reflex time, a monitored eye motion, a monitored heart rate, or any combination thereof.

In some examples of the method, apparatuses, and non-transitory computer-readable medium described herein, monitoring the one or more user input attributes may include operations, features, means, or instructions for monitoring, over a time interval, a first set of user input attributes and a second set of user input attributes. Some examples of the method, apparatuses, and non-transitory computer-readable medium described herein may further include operations, features, means, or instructions for updating the first set of gameplay attributes based on the first set of user input attributes, and identifying that the second set of user input attributes differs from the first set of gameplay attributes by a threshold based on the comparison and the time interval, where the user may be determined to be an inauthentic user of the user account based on the second set of user input attributes.

Some examples of the method, apparatuses, and non-transitory computer-readable medium described herein may further include operations, features, means, or instructions for training a machine learning model based on the first set of gameplay attributes, the second set of gameplay attributes, or both, where the comparison may be based on the trained machine learning model.

In some examples of the method, apparatuses, and non-transitory computer-readable medium described herein, comparing the one or more user input attributes to the first set of gameplay attributes, the second set of gameplay attributes, or both may include operations, features, means, or instructions for inputting the one or more user input attributes in to the trained machine learning model, where the determination of whether the user may be the authentic user of the user account may be based on an output of the trained machine learning model. In some examples of the method, apparatuses, and non-transitory computer-readable medium described herein, the first set of gameplay attributes may be identified based on a second set of one or more user input attributes of the user monitored during a previous interactive gameplay session.

In some examples of the method, apparatuses, and non-transitory computer-readable medium described herein, the first set of gameplay attributes may be identified based on a second set of one or more user input attributes associated with a second user of similar player rank to the user. In some examples of the method, apparatuses, and non-transitory computer-readable medium described herein, the second set of gameplay attributes may be identified based on a set of one or more automated input attributes, one or more bot input attributes, a second set of one or more user input attributes associated with a second user of different player rank than the user, or any combination thereof.

In some examples of the method, apparatuses, and non-transitory computer-readable medium described herein, the second set of gameplay attributes may be associated with a bot, a sold account, a transferred account, a second user account, or any combination thereof. In some examples of the method, apparatuses, and non-transitory computer-readable medium described herein, the inauthentic input includes input associated with a bot, automated input, or input from a second user that may be different from the user.

Some examples of the method, apparatuses, and non-transitory computer-readable medium described herein may further include operations, features, means, or instructions for determining to authenticate the user and prompting the interactive gameplay session during a second interactive gameplay session based on the determination to authenticate the user, wherein the interactive gameplay session comprises a gameplay session to authenticate the user for the second interactive gameplay session.

Some examples of the method, apparatuses, and non-transitory computer-readable medium described herein may further include operations, features, means, or instructions for determining one or more user characteristics and determining a similarity threshold for the comparison based on the one or more user characteristics, where the comparison of the one or more input attributes of the user to the first set of gameplay attributes, the second set of gameplay attributes, or both may be based on the similarity threshold.

DETAILED DESCRIPTION

Figure 1:
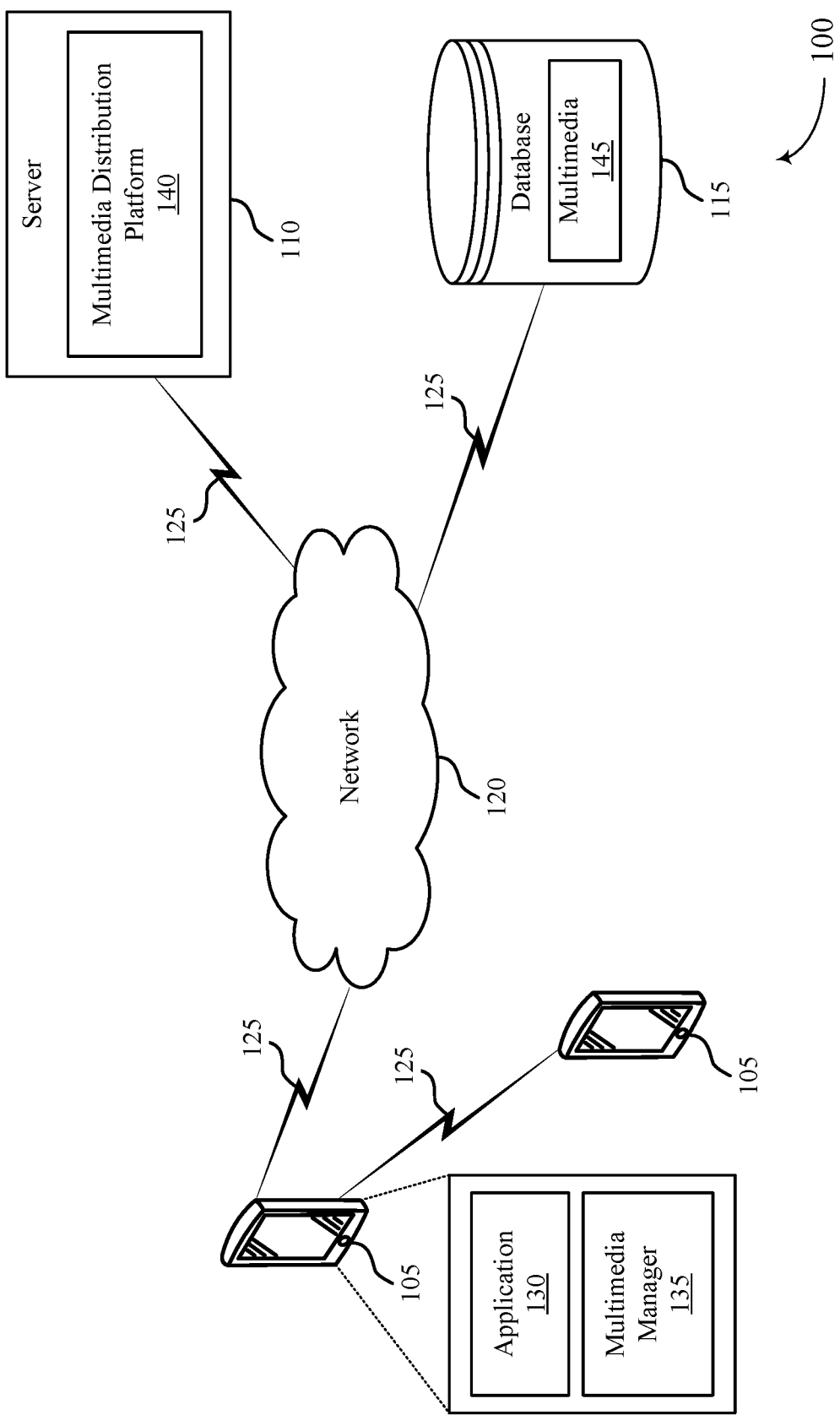
FIG. 1 illustrates an example of a system for user authentication that supports using sensor statistics for player authentication in accordance with aspects of the present disclosure.

The described techniques relate to improved methods, systems, or devices that support user (e.g., player) authentication. Other authentication systems for online gaming may be limited to consideration of user credentials. In some cases, such authentication systems may be vulnerable to false authentication of a user based on, for example, shared credentials (e.g., for level boosting), stolen or hacked credentials, etc. In some examples, authentication systems may rely on credentials such as passwords, authorization codes, or biometric data to authenticate a player, and these credentials may also be faked or shared to benefit the player account. For example, player credentials may be shared to increase a player rank (e.g., an authentic user of an account may intentionally pass authentication for an inauthentic user, such that the inauthentic user may illegitimately play on behalf of the authentic user for level boosting). For instance, player credentials associated with a first (e.g., authentic) user may be illegitimately shared (e.g., shared with a second player, shared with a software program, etc.) to benefit the first user (e.g., for leveraging robots (BOTs), inauthentic users of higher player rank, inauthentic users for additional gameplay time on the account, for level boosting, other forms of cheating, etc.).

The techniques described herein may provide for improved authentication systems (e.g., more accurate authentication systems, more reliable authentication systems, etc.) by using sensor statistics to measure how users are interacting with a game in real-time. Generally, the described techniques may include analyzing sensor data to measure how users interact with peripheral and input devices (e.g., mouse, keyboard, joystick, virtual reality headset, display, touchscreen, headphones, microphone, etc.) and use the resulting sensor statistics to authenticate users. In some cases, a peripheral device may include one or more of the monitored sensors integrated in peripheral devices or controllers (e.g., smartphones, joysticks, keyboards, etc.), or in both. In some cases, one or more of the monitored sensors may be external to a peripheral device (e.g., camera, fingerprint sensor, motion tracking device, microphone, etc.). Such sensor statistics (e.g., gameplay attributes) may be used in addition to, or as an alternate to, traditional user credentials (e.g., a username and password) for more accurate, reliable, robust, and continuous authentication systems.

Some examples of the monitored sensors may include inertial measurement units (IMUs), eye trackers, tremor sensors, heart rate sensors, etc. In some cases, an IMU may be included in a game controller, virtual reality (VR) headset, etc., and may measure and report a body's specific force, angular rate, and sometimes the orientation of the body, using some combination of accelerometers, gyroscopes, or magnetometers. Supplementing or replacing other authentication systems with real-time sensor information, real-time player corrections and adjustments, and related player information may improve the other authentication systems by providing alternative or additional information for player authentication. In some cases, player authentication may be based on gameplay attributes that are associated with past gameplay or expected gameplay. In some cases, the player authentication may be based on an event (e.g., a player login), while in some additional or alternative examples, the player authentication may be based on a series of events (e.g., live gameplay, real-time events, etc.).

In some cases, the methods, systems, or devices described herein may support the monitoring, analysis, and implementation of player authentication. The described techniques may be effective at authenticating a user based on comparing one or more user input attributes of the user to a first set of gameplay attributes, a second set of gameplay attributes, or both. In some examples, the user may be authenticated or refused authentication (e.g., not authenticated) based on monitoring one or more user input attributes of the user with a first peripheral or input device (e.g., sensor statistics from a mouse, keyboard, joystick, touch screen, etc.). In some cases, the first set of gameplay attributes and the second set of gameplay attributes may be associated with human gameplay. In some examples, the second set of gameplay attributes may be associated with a computerized player (e.g., a BOT player, a simulated player, players of different rank than the authentic user, etc.). In some additional or alternative examples, the second set of gameplay attributes may be based on an ideal simulation reference model (e.g., to detect BOT play). Any user input attributes may be analyzed (e.g., and authenticated or denied authentication) based on the ideal simulation reference model in order to analyze the performance of the user (e.g., in some cases, identification of player rank, spikey behavior or boosting, etc. may be based on comparisons to the ideal simulation reference model, deviations between comparisons across time, etc.).

As such, a device or system may monitor one or more user input attributes of the user during an interactive gameplay session. As discussed herein, user input attributes may include input patterns, reflex time, etc. monitoring from an input device. User input attributes may also include other measurements of a user such as eye motion (e.g., from a camera sensor on or near the display), heart rate, tremors, frequency of operation (e.g., how often the user logs in to the account), etc. The monitoring may enable the detection of user behaviors (e.g., user eye movement relative to a display of a computing device, finger movement relative to a peripheral device of a computing device, rate of finger movement, complexity of finger movement, user breathing rate, user breathing patterns, user heartrate, etc.). This monitoring and analysis may identify real-time user skill level and gameplay anomalies in order to authenticate a user (e.g., continuously, periodically during live game play, etc.).

Aspects of the disclosure are initially described in the context of a multimedia system. Aspects of the disclosure are further illustrated by and described with reference to an authentication system. Aspects of the disclosure are further illustrated by and described with reference to apparatus diagrams, system diagrams, and flowcharts that relate to using sensor statistics for player authentication.

FIG. 1 illustrates a multimedia system 100 for a device that supports using sensor statistics for player authentication in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports using sensor statistics for player authentication, such as multimedia packets, multimedia data, or multimedia control information, via network 120 using communications links 125. In some cases, a portion or all of the techniques described herein supporting using sensor statistics for player authentication may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and a multimedia manager 135. While, the multimedia system 100 illustrates the devices 105 including both the application 130 and the multimedia manager 135, the application 130 and the multimedia manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 135 may process multimedia (e.g., image data, video data, audio data) from and/or write multimedia data to a local memory of the device 105 or to the database 115.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 135 may process multimedia data to support using sensor statistics for player authentication, according to the techniques described herein.

The server 110 may be a data server, a cloud server, a server associated with a multimedia subscription provider, proxy server, web server, application server, gaming server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support using sensor statistics for player authentication associated with the multimedia 145. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information). The database 115 may store a reference model (e.g., a machine learning model, a simulation model, etc.), and in some cases, the machine learning model may be updated based on user input received from a device 105.

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The wireless links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

In some cases, a device 105 may monitor user input attributes via a sensor on the device. For example, the device 105 may monitor data related to reflex time, eye motion, heart rate, a gameplay patter, or any combination thereof. In some examples, the device 105 may monitor user actions, real-time game play data, post-match game play data, sensor data from sensors on the device, user interactions with the application 130. For example, the device 105 may monitor the application 130 for game play statistics such as user scores, rate of points earned in a given time period, a length or time period of a match, etc. Similarly, a device 105 may monitor sensors associated with the device 105 for sensor statistics such as user eye movement relative to a display of a device, finger movement relative to peripheral device, rate of finger movement, complexity of finger movement, user breathing rate, user breathing patterns, user heartrate, etc.

In some examples, a server 110 may compare one or more user input attributes to a set of gameplay attributes. The server 110 may additionally or alternatively determine whether a user (e.g., a user associated with the device 105) is an authentic user based on the comparison. In some examples, the device 105 may run the application 130. The device 105 may also implement one or more functions of the server 110 and/or the database 115. For example, the device 105 may utilize the server 110 to monitor the application 130 for gameplay data and sensor statistics from sensors associated with the device 105. In some examples, match data from device 105 may include monitored user actions, real-time game play data, post-match game play data, sensor data from the sensors associated with a device 105, and user interactions with the application 130.

For example, the device 105 may monitor the application 130 for game play statistics such as user scores, rate of points earned in a given time period, a length or time period of a match, etc. In some cases, spikey player behavior may be identified based on a rate of points earned in a given time period, and in some cases, inauthentic gameplay may be identified based on spikey player behavior. For example, if a player's rate of points earned in a given time period exceeds a threshold, the player's behavior may be identified as spikey (e.g., inconsistent, erratic, etc.), and the gameplay may be identified as inauthentic. Similarly, device 105 may monitor a multimedia manager 135 for sensor statistics such user eye movement relative to a display of a computing device, finger movement relative to peripheral, rate of finger movement, complexity of finger movement, user breathing rate, user breathing patterns, user heartrate, etc. In some additional or alternative cases, a server 110 may monitor a multimedia manager 135 for gameplay statistics such as length of gameplay, frequency of gameplay, type of gameplay, player rank, or any combination thereof.

In some cases, a server 110 may monitor player activity (e.g., user input attributes), compare the player activity to a set of gameplay attributes, or determine whether the player activity (e.g., user activity) is authentic. In some examples, the server 110 may monitor a device 105 or an application 130 for player activity, while in some additional or alternative examples, the device 105 may monitor the application 130 for player activity and/or gameplay attributes and transmit the player activity and/or gameplay attributes to the server 110. The player activity and/or gameplay attributes may include sensor data (e.g., data collected from a sensor associated with the device 105, data associated with user input, statistics associated with player activity, etc.). In some cases, the server 110 or the device 105 may store the player activity and/or gameplay attributes in a database 115. In some cases, the server 110 may compare player activity to a set of gameplay attributes, and the player activity and/or gameplay attributes may be read from the database 115. In some cases, the device 105 may store the player activity and/or gameplay attributes, may compare player activity to the set of gameplay attributes, and may authenticate (e.g., or not authenticate) a user.

In some cases, a server 110 may determine an ideal behavior interaction with an application 130 or a device 105, or both, based on the monitoring of the behaviors of the users interacting with applications 130 or devices 105, or both. In some cases, server 110 (e.g., via multimedia distribution platform 140) may use physics simulators to determine an ideal behavior with application 130 or peripheral device 105, or both. In some cases, server 110 (e.g., via multimedia distribution platform 140) may associate behaviors of users of a given skill level interacting with application 130 or device 105, or both, to determine an ideal behavior with application 130 or device 105, or both, for the given skill level.

A server 110 may process the information from a database 115 in a machine learning algorithm. In some cases, a server 110 may be configured to use machine learning to determine how users are controlling input devices and use sensor information (e.g., sensor statistics associated with a device 105) to augment the determination of user authentication. In some cases, the server 110 may process the information from the database 115 in the machine learning algorithm to identify a correlation between sensor statistics and user authentication (e.g., to correlate monitored user input with a first set of gameplay attributes or a second set of gameplay attributes). The data from the database 115 may include information from past matches or ongoing matches, or both. In some cases, the machine learning algorithm may include a supervised learning framework that the server 110 uses to calibrate player authentication based on match outcomes and sensor statistics. Examples of the machine learning algorithm may include linear regression, logistic regression, decision tree, support vector machine (SVM), naive Bayes, k-nearest neighbor, random forest, dimensionality reduction algorithms, gradient boosting algorithms, or any combination thereof.

In some examples, inputs to the machine learning algorithm may include match outcomes or sensor statistics, or both, for one or more users (e.g., the first user from the group of users or the second user from the group of users, or both). In some cases, inputs to the machine learning algorithm may include match outcomes paired with sensor statistics. In some cases, inputs to the machine learning algorithm may include match outcomes paired with sensor statistics and one or more users. An output of the machine learning algorithm may include a predicted user authentication (e.g., whether a user is an authentic user, whether gameplay is authentic gameplay, etc.) based on an input of at least sensors statistics. For example, the machine learning algorithm may include a model that predicts user authentication based on inputs of at least match outcomes or sensor statistics, or both.

In one example, the machine learning algorithm may be trained to associate monitored sensor statistics (e.g., monitored in real-time) with user authentication. For example, the machine learning algorithm may determine that a portion of a game involves a precise operation. Examples of the precise operation may include at least one of moving a joystick with a particular precision and accuracy, or moving a mouse with a particular precision and accuracy, or moving a mouse with a particular precision and accuracy while clicking a button of the mouse, or pressing a combination of keys of the keyboard in a particular sequence such as A-D-W-S-W-D-D-A, or pressing the combination of keys of the keyboard within a particular time period, or any combination thereof.

As one example, based on its training, the machine learning algorithm may learn that it takes a player at level 1 (e.g., beginner level) one second (1000 milliseconds) or longer to finish pressing the combination of keys of the keyboard in the particular sequence, that a player at level 2 may press the combination of keys in the particular sequence within 800 to 900 milliseconds, that a player at level 3 may press the combination of keys in the particular sequence within 700 to 800 milliseconds, that a player at level 4 may press the combination of keys in the particular sequence within 600 to 700 milliseconds, that a player at level 5 may press the combination of keys in the particular sequence within 500 to 600 milliseconds, that a player at level n may press the combination of keys in the particular sequence under 200 milliseconds, and so forth. Accordingly, after being trained the machine learning algorithm may predict that a player being monitored (e.g., monitoring sensor statistics of the player in real-time) is likely inauthentic (e.g., a BOT) because the monitoring and analysis of the combination of keys (e.g., among other monitored sensor statistics) indicate that the player presses the combination of keys within 700 to 800 milliseconds. Accordingly, the player may be identified as inauthentic based on the predicted player level and an actual player level (e.g., rank) associated with the player, and the predicted player level may be based at least in part on the analysis of the sensor statistics associated with the machine learning algorithm.

Additionally or alternatively, a machine learning algorithm may identify spikey behavior. For instance, if a user identified at a level 1 for some period of time suddenly presses the combination of keys in accordance with a player at level 5, the machine learning algorithm may identify inauthentic game play (e.g., and potential boosting). Similarly, if a user identified at a level 5 for some period of time suddenly presses the combination of keys in accordance with a player at level 1, the machine learning algorithm may identify inauthentic game play (e.g., and a potentially sold or transferred account).

In some cases, an output of the machine learning algorithm may be included with user authentication parameters. For example, user ranking parameters may include at least one of authentication outcomes, predicted player level, match outcomes, sensor statistics, a predicted match outcome, or any combination thereof. The described techniques may enable a server 110 to use sensor information associated with a device 105 to measure how users are controlling an input device, and then use this sensor information to augment the determination of user authentication. By supplementing the current authentication systems with real-time sensor information, the described techniques provide more accurate determination of user authentication as well as a faster and more robust identification of stolen and shared user accounts as compared to other systems.

The techniques described herein may provide improvements in player authentication. For example, the techniques described herein may improve real-time player authentication, BOT detection, account sharing detection, account theft detection, or any combination thereof. Furthermore, the techniques described herein may provide benefits and enhancements to the operation of the devices 105. For example, by implementing player authentication based on an analysis of gameplay attributes, player authentication may be performed in a real-time or continuous fashion, and this real-time authentication may improve the identification of inauthentic gameplay. In some cases, player authentication based on an analysis of gameplay attributes may support the training and/or use of machine learning models to support player authentication. For example, a machine learning model may be updated (e.g., trained) online and provide an adaptive solution for player authentication. An adaptive solution for player authentication may allow expected player behavior to evolve as the actual player behavior evolves, thereby improving the identification of inauthentic gameplay.

Figure 2:
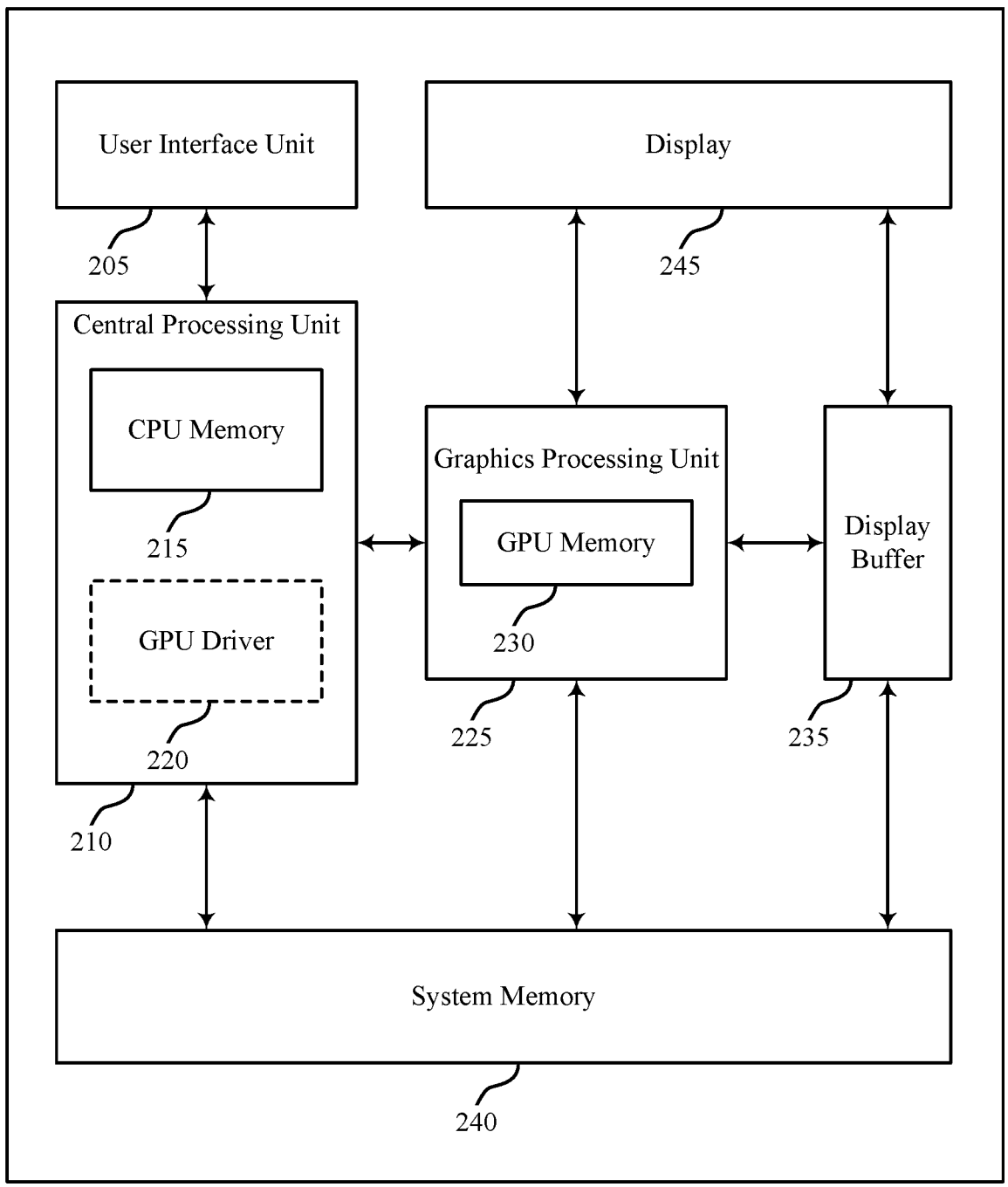
FIG. 2 illustrates an example of a device that supports using sensor statistics for player authentication in accordance with aspects of the present disclosure.

In the example of FIG. 2, the device 200 includes a central processing unit (CPU) 210 having CPU memory 215, a GPU 225 having GPU memory 230, a display 245, a display buffer 235 storing data associated with rendering, a user interface unit 205, and a system memory 240. For example, system memory 240 may store a GPU driver 220 (illustrated as being contained within CPU 210 as described below) having a compiler, a GPU program, a locally-compiled GPU program, and the like. User interface unit 205, CPU 210, GPU 225, system memory 240, and display 245 may communicate with each other (e.g., using a system bus).

Examples of CPU 210 include, but are not limited to, a digital signal processor (DSP), general purpose microprocessor, application specific integrated circuit (ASIC), field programmable logic array (FPGA), or other equivalent integrated or discrete logic circuitry. Although CPU 210 and GPU 225 are illustrated as separate units in the example of FIG. 2, in some examples, CPU 210 and GPU 225 may be integrated into a single unit. CPU 210 may execute one or more software applications. Examples of the applications may include operating systems, word processors, web browsers, e-mail applications, spreadsheets, video games, audio and/or video capture, playback or editing applications, or other such applications that initiate the generation of image data to be presented via display 245. As illustrated, CPU 210 may include CPU memory 215. For example, CPU memory 215 may represent on-chip storage or memory used in executing machine or object code. CPU memory 215 may include one or more volatile or non-volatile memories or storage devices, such as flash memory, a magnetic data media, an optical storage media, etc. CPU 210 may be able to read values from or write values to CPU memory 215 more quickly than reading values from or writing values to system memory 240, which may be accessed, e.g., over a system bus.

GPU 225 may represent one or more dedicated processors for performing graphical operations. That is, for example, GPU 225 may be a dedicated hardware unit having fixed function and programmable components for rendering graphics and executing GPU applications. GPU 225 may also include a DSP, a general purpose microprocessor, an ASIC, an FPGA, or other equivalent integrated or discrete logic circuitry. GPU 225 may be built with a highly-parallel structure that provides more efficient processing of complex graphic-related operations than CPU 210. For example, GPU 225 may include a plurality of processing elements that are configured to operate on multiple vertices or pixels in a parallel manner. The highly parallel nature of GPU 225 may allow GPU 225 to generate graphic images (e.g., graphical user interfaces and two-dimensional or three-dimensional graphics scenes) for display 245 more quickly than CPU 210.

GPU 225 may, in some instances, be integrated into a motherboard of device 200. In other instances, GPU 225 may be present on a graphics card that is installed in a port in the motherboard of device 200 or may be otherwise incorporated within a peripheral device configured to interoperate with device 200. As illustrated, GPU 225 may include GPU memory 230. For example, GPU memory 230 may represent on-chip storage or memory used in executing machine or object code. GPU memory 230 may include one or more volatile or non-volatile memories or storage devices, such as flash memory, a magnetic data media, an optical storage media, etc. GPU 225 may be able to read values from or write values to GPU memory 230 more quickly than reading values from or writing values to system memory 240, which may be accessed, e.g., over a system bus. That is, GPU 225 may read data from and write data to GPU memory 230 without using the system bus to access off-chip memory. This operation may allow GPU 225 to operate in a more efficient manner by reducing the need for GPU 225 to read and write data via the system bus, which may experience heavy bus traffic.

Display 245 represents a unit capable of displaying video, images, text or any other type of data for consumption by a viewer. Display 245 may include a liquid-crystal display (LCD), a light emitting diode (LED) display, an organic LED (OLED), an active-matrix OLED (AMOLED), or the like. Display buffer 235 represents a memory or storage device dedicated to storing data for presentation of imagery, such as computer-generated graphics, still images, video frames, or the like for display 245. Display buffer 235 may represent a two-dimensional buffer that includes a plurality of storage locations. The number of storage locations within display buffer 235 may, in some cases, generally correspond to the number of pixels to be displayed on display 245. For example, if display 245 is configured to include 640×480 pixels, display buffer 235 may include 640×480 storage locations storing pixel color and intensity information, such as red, green, and blue pixel values, or other color values. Display buffer 235 may store the final pixel values for each of the pixels processed by GPU 225. Display 245 may retrieve the final pixel values from display buffer 235 and display the final image based on the pixel values stored in display buffer 235.

User interface unit 205 represents a unit with which a user may interact with or otherwise interface to communicate with other units of device 200, such as CPU 210. Examples of user interface unit 205 include, but are not limited to, a trackball, a mouse, a keyboard, and other types of input devices. User interface unit 205 may also be, or include, a touch screen and the touch screen may be incorporated as part of display 245.

System memory 240 may comprise one or more computer-readable storage media. Examples of system memory 240 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. System memory 240 may store program modules and/or instructions that are accessible for execution by CPU 210. Additionally, system memory 240 may store user applications and application surface data associated with the applications. System memory 240 may in some cases store information for use by and/or information generated by other components of device 200. For example, system memory 240 may act as a device memory for GPU 225 and may store data to be operated on by GPU 225 as well as data resulting from operations performed by GPU 225

In some examples, system memory 240 may include instructions that cause CPU 210 or GPU 225 to perform the functions ascribed to CPU 210 or GPU 225 in aspects of the present disclosure. System memory 240 may, in some examples, be considered as a non-transitory storage medium. The term "non-transitory" should not be interpreted to mean that system memory 240 is non-movable. As one example, system memory 240 may be removed from device 200 and moved to another device. As another example, a system memory substantially similar to system memory 240 may be inserted into device 200. In certain examples, a non-transitory storage medium may store data that can, over time, change (e.g., in RAM).

System memory 240 may store a GPU driver 220 and compiler, a GPU program, and a locally-compiled GPU program. The GPU driver 220 may represent a computer program or executable code that provides an interface to access GPU 225. CPU 210 may execute the GPU driver 220 or portions thereof to interface with GPU 225 and, for this reason, GPU driver 220 is shown in the example of FIG. 2 within CPU 210. GPU driver 220 may be accessible to programs or other executables executed by CPU 210, including the GPU program stored in system memory 240. Thus, when one of the software applications executing on CPU 210 requires graphics processing, CPU 210 may provide graphics commands and graphics data to GPU 225 for rendering to display 245 (e.g., via GPU driver 220).

In some cases, the GPU program may include code written in a high level (HL) programming language, e.g., using an application programming interface (API). Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of a GPU 225 to execute commands without user knowledge as to the specifics of the hardware components. In order to process the graphics rendering instructions, CPU 210 may issue one or more rendering commands to GPU 225 (e.g., through GPU driver 220) to cause GPU 225 to perform some or all of the rendering of the graphics data. In some examples, the graphics data to be rendered may include a list of graphics primitives (e.g., points, lines, triangles, quadrilaterals, etc.).

The GPU program stored in system memory 240 may invoke or otherwise include one or more functions provided by GPU driver 220. CPU 210 generally executes the program in which the GPU program is embedded and, upon encountering the GPU program, passes the GPU program to GPU driver 220. CPU 210 executes GPU driver 220 in this context to process the GPU program. That is, for example, GPU driver 220 may process the GPU program by compiling the GPU program into object or machine code executable by GPU 225. This object code may be referred to as a locally-compiled GPU program. In some examples, a compiler associated with GPU driver 220 may operate in real-time or near-real-time to compile the GPU program during the execution of the program in which the GPU program is embedded. For example, the compiler generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, CPU 210 and GPU 225).

In the example of FIG. 2, the compiler may receive the GPU program from CPU 210 when executing HL code that includes the GPU program. That is, a software application being executed by CPU 210 may invoke GPU driver 220 (e.g., via a graphics API) to issue one or more commands to GPU 225 for rendering one or more graphics primitives into displayable graphics images. The compiler may compile the GPU program to generate the locally-compiled GPU program that conforms to a LL programming language. The compiler may then output the locally-compiled GPU program that includes the LL instructions. In some examples, the LL instructions may be provided to GPU 225 in the form a list of drawing primitives (e.g., triangles, rectangles, etc.).

The LL instructions (e.g., which may alternatively be referred to as primitive definitions) may include vertex specifications that specify one or more vertices associated with the primitives to be rendered. The vertex specifications may include positional coordinates for each vertex and, in some instances, other attributes associated with the vertex, such as color coordinates, normal vectors, and texture coordinates. The primitive definitions may include primitive type information, scaling information, rotation information, and the like. Based on the instructions issued by the software application (e.g., the program in which the GPU program is embedded), GPU driver 220 may formulate one or more commands that specify one or more operations for GPU 225 to perform in order to render the primitive. When GPU 225 receives a command from CPU 210, it may decode the command and configure one or more processing elements to perform the specified operation and may output the rendered data to display buffer 235.

GPU 225 generally receives the locally-compiled GPU program, and then, in some instances, GPU 225 renders one or more images and outputs the rendered images to display buffer 235. For example, GPU 225 may generate a number of primitives to be displayed at display 245. Primitives may include one or more of a line (including curves, splines, etc.), a point, a circle, an ellipse, a polygon (e.g., a triangle), or any other two-dimensional primitive. The term "primitive" may also refer to three-dimensional primitives, such as cubes, cylinders, sphere, cone, pyramid, torus, or the like. Generally, the term "primitive" refers to any basic geometric shape or element capable of being rendered by GPU 225 for display as an image (or frame in the context of video data) via display 245. GPU 225 may transform primitives and other attributes (e.g., that define a color, texture, lighting, camera configuration, or other aspect) of the primitives into a so-called "world space" by applying one or more model transforms (which may also be specified in the state data). Once transformed, GPU 225 may apply a view transform for the active camera (which again may also be specified in the state data defining the camera) to transform the coordinates of the primitives and lights into the camera or eye space. GPU 225 may also perform vertex shading to render the appearance of the primitives in view of any active lights. GPU 225 may perform vertex shading in one or more of the above model, world, or view space.

Once the primitives are shaded, GPU 225 may perform projections to project the image into a canonical view volume. After transforming the model from the eye space to the canonical view volume, GPU 225 may perform clipping to remove any primitives that do not at least partially reside within the canonical view volume. That is, GPU 225 may remove any primitives that are not within the frame of the camera. GPU 225 may then map the coordinates of the primitives from the view volume to the screen space, effectively reducing the three-dimensional coordinates of the primitives to the two-dimensional coordinates of the screen. Given the transformed and projected vertices defining the primitives with their associated shading data, GPU 225 may then rasterize the primitives. Generally, rasterization may refer to the task of taking an image described in a vector graphics format and converting it to a raster image (e.g., a pixelated image) for output on a video display or for storage in a bitmap file format.

A GPU 225 may include a dedicated fast bin buffer (e.g., a fast memory buffer, such as GMEM, which may be referred to by GPU memory 230). As discussed herein, a rendering surface may be divided into bins. In some cases, the bin size is determined by format (e.g., pixel color and depth information) and render target resolution divided by the total amount of GMEM. The number of bins may vary based on device 200 hardware, target resolution size, and target display format. A rendering pass may draw (e.g., render, write, etc.) pixels into GMEM (e.g., with a high bandwidth that matches the capabilities of the GPU). The GPU 225 may then resolve the GMEM (e.g., burst write blended pixel values from the GMEM, as a single layer, to a display buffer 235 or a frame buffer in system memory 240). Such may be referred to as bin-based or tile-based rendering. When all bins are complete, the driver may swap buffers and start the binning process again for a next frame.

For example, GPU 225 may implement a tile-based architecture that renders an image or rendering target by breaking the image into multiple portions, referred to as tiles or bins. The bins may be sized based on the size of GPU memory 230 (e.g., which may alternatively be referred to herein as GMEM or a cache), the resolution of display 245, the color or Z precision of the render target, etc. When implementing tile-based rendering, GPU 225 may perform a binning pass and one or more rendering passes. For example, with respect to the binning pass, GPU 225 may process an entire image and sort rasterized primitives into bins.

Device 200 (e.g., which in some cases may represent a video game system, an electronic sports (Esports) system, a gaming console, a gaming controlling, etc.) may utilize sensors (e.g., user interface unit 205) to authenticate a player (e.g., a user) to an account during gameplay (e.g., continuously or periodically in real-time during gameplay). Users may be authenticated by matching sensed gameplay attributes (e.g., indicators, reflex time, sensed patterns, eye motion, heart rate, tremors, frequency of operation, periodicity, spiky behavior, eye concentration, etc.) to the account. For example, collected sensor data from user interface unit 205 may be compared to the account's history or past sensor data, or may be compared to similar ranked players' sensor data. The device 200 may further use additional data (e.g., a second set of gameplay attributes) including robot (e.g., BOT) gameplay, sold/transferred accounts, sensor data collected from other players of different (e.g., higher) rank, etc. to identify when information collected by the user interface unit 205 may be associated with inauthentic gameplay.

Figure 3:
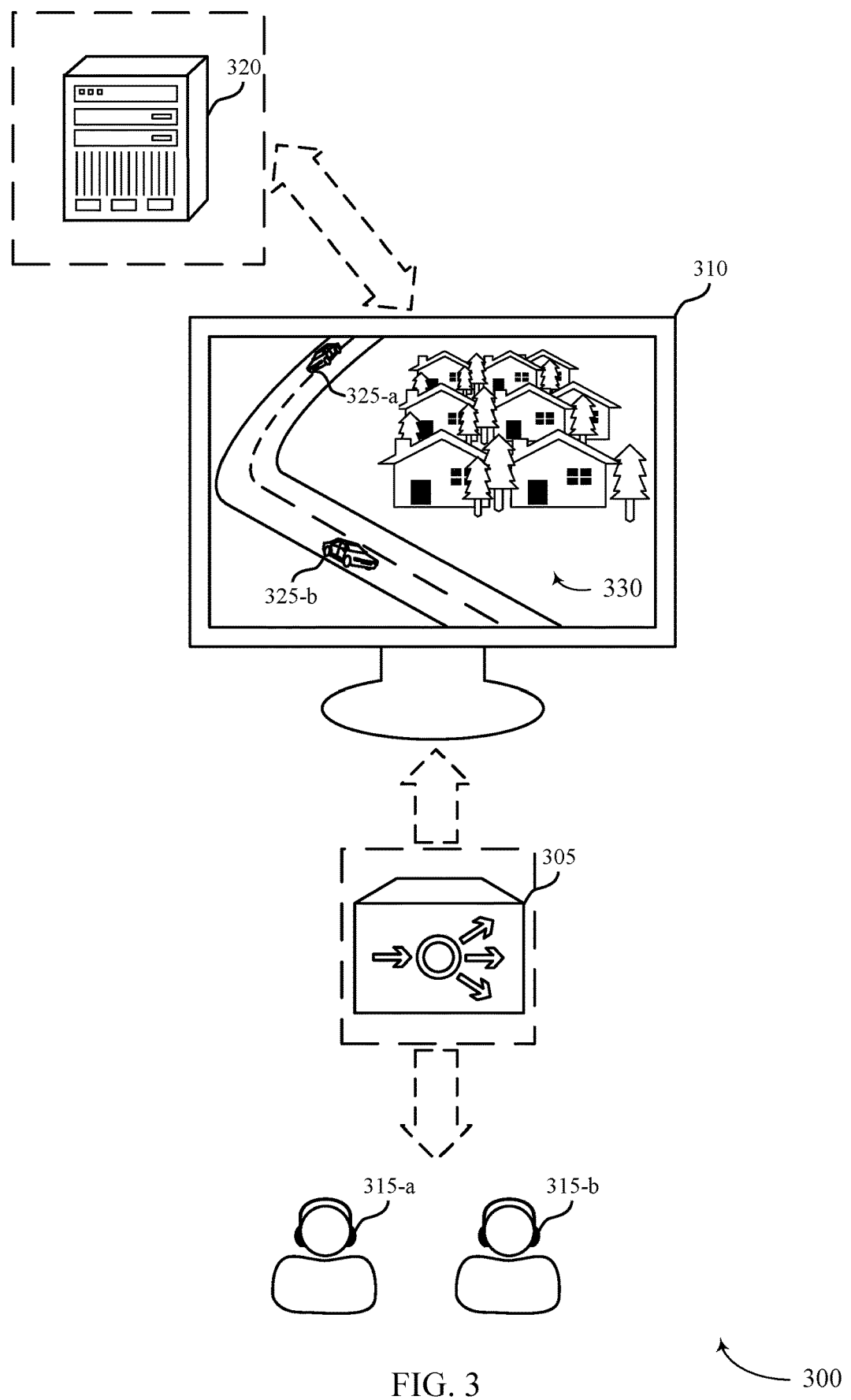
FIG. 3 illustrates an example of an authentication system that supports using sensor statistics for player authentication in accordance with aspects of the present disclosure.

FIG. 3 illustrates an example of an authentication system 300 that supports using sensor statistics for player authentication in accordance with aspects of the present disclosure. In some examples, the authentication system 300 may implement aspects of multimedia system 100. The authentication system 300 includes a number of users 315, a device 305, a display 310, a server 320, a number of game characters 325, and a game 330, which may be examples or components of one or more servers and/or devices as described herein, for example, with reference to FIGS. 1 and 2. For example, the server 320 may be an example or components of a server 110. In some examples, the device 305 and/or the display 310 may be examples or components of a device 105 or device 200.

In accordance with the techniques described herein, authentication system 300 may analyze sensor data to measure how users interact with sensors (e.g., peripheral and input devices such as a mouse, keyboard, joystick, virtual reality headset, display, touchscreen, headphones, microphone, etc.) and use the resulting sensor statistics to authenticate users 315. In some cases, device 305 may include one or more of such sensors (e.g., such as an IMU, a heart rate monitor, joystick, input buttons, etc.). Further, one or more of the monitored sensors may be external to device 305 (e.g., camera, fingerprint sensor, motion tracking device, microphone, etc.). For instance, in some cases, authentication system 300 may utilize a camera module on display 310 for eye tracking (e.g., rate and frequency of eye movements, eye speed, predictive eye pattern behavior, etc.). Such sensor statistics (e.g., gameplay attributes) may be used in addition to, or as an alternate to, traditional user credentials (e.g., a username and password) for more accurate, reliable, robust, and continuous authentication systems.

The example authentication system 300 is illustrated for descriptive purposes, and is not intended to limit the scope of the present disclosure. For instance, the authentication system 300 may illustrate an example system wherein the server 320, the display 310, and the device 305 are separate devices. However, any of these elements may be combined or omitted, additional elements may be included in authentication system 300, etc. For example, the device 305 may include a display 310, and in some cases, the server 320 may communicate with the device 305. In some examples, a device 305 may be an example of a device 105 as described with reference to FIG. 1. In some cases, the server 320 may be omitted from the authentication system 300. The device 305, display 310, or server 320 may contain sensors, and the sensors may support the monitoring of one or more user input attributes. For example, a device 305 or a display 310 may contain or otherwise support sensors (e.g., IMUs, eye trackers such as camera modules, tremor sensors, accelerometers, heart rate sensors, etc.) that may be used to monitor a user 315 during an interactive game session. In some additional or alternative examples, a server 320 may contain or otherwise support hardware and/or software for monitoring and/or analyzing data obtained from the sensors. In some cases, devices or sensors may be connected to device 305 (e.g., in cases where device 305 is a video game console, video game controllers may be connected to device 305 to collect user input).

Aspects of the described techniques may be performed by various elements of the authentication system 300. For example, gameplay attributes may be identified by a server 320 and/or a device 305. User input attributes may be monitored by a device 305, a display 310 (e.g., via a camera), and/or a server 320. For example, a server 320 may implement software for monitoring user input attributes associated with how a game character (e.g., game character 325) moves on a display 310. In some additional or alternative examples, a device 305 may monitor sensors associated with the device 305 and/or the display 310. In some cases, a server 320 or a device 305 may determine whether a user 315 is an authentic user based on the user input attributes.

In some cases, a user 315 (e.g., a player) may be associated with a user account, and the user 315 may play a game 330 as a character 325. For example, user 315-a may play a racing game as game character 325-a (e.g., a car or race car driver), and user 315-b may play the racing game as game character 325-b. Generally, games 330 may include, for example, racing games, fighting games, first person shooter (FPS) games, real-time strategy (RTS) games, multiplayer online battle arena (MOBA) games, etc. In some cases, user input attributes (e.g., monitored sensor statistics) may depend on the type of game 330. For instance, user input attributes may include input string/combo preference for different characters, input string cleanness measure, input rate etc. for fighting games. User input attributes may include keyboard heatmap, in-game keybinding setting, mouse sensitivity setting etc. for RTS and MOBA games 330. User input attributes may include mode of operation (tilt, steering wheel, stick button, etc.) for racing games, which may be used to decide on angular rate of changing direction for either tilt or steering wheel (e.g., features such as efficiency and time of switching between throttle and break to enter a turn may also be used).

The server 320 or device 305 may identify a first set of gameplay attributes associated with a user account. In some cases, user 315-a may sign into the user account, and the server 320 or device 305 may identify a first set of gameplay attributes associated with the user account. The first set of gameplay attributes may be based on past play of user 315-a, gameplay associated with user 315-a, or gameplay associated with the game 330.

The server 320 or device 305 may identify a second set of gameplay attributes associated with inauthentic input. In some cases, the second set of gameplay attributes may be associated with user 315-b. For example, user 315-a may share account credentials (e.g., password, biometric information, etc.) with user 315-b, and user 315-b may sign into the user account associated with user 315-a. In some additional or alternative cases, user 315-b may steal user 315-a's account credentials and sign into the user account. The second set of gameplay attributes may be associated with a BOT or simulated player. For example, the second set of gameplay attributes may be associated BOT or simulated gameplay, and in some cases, the second set of gameplay attributes may not be associated with a user 315. In some cases, the second set of gameplay attributes may not be associated with sensor data and the server 320 or device 305 may determine that a user 315 is an inauthentic user based on the total or partial lack of sensor data.

In some cases, the server 320 or device 305 may monitor one or more user input attributes of a user 315 during an interactive gameplay session. For example, the server 320 or device 305 may monitor user input attributes associated with user 315-a via one or more sensors associated with the device 305. The server 320 or device 305 may compare the one or more user input attributes of user 315-a to the first set of gameplay attributes, the second set of gameplay attributes, or both. The server 320 or device 305 may determine whether user 315-a is an authentic user of the user account based on the comparison.

As used herein, an interactive gameplay session may refer to any session or interval of gameplay (e.g., playing of a video game) by a user 315. For example, an interactive gameplay session (e.g., a session of playing a game 330) may refer to an Esports game session, a competitive gaming session, live or online gameplay session, a recorded gameplay session, a contest, a match, a tournament, etc. Further, an interactive gameplay session may generally refer to any such gameplay, which may include various games 330 or occupations such as fighting games, racing games, FPS, games, etc. Any of such gameplay sessions may be used to monitor for, collect, and analyze user input attributes as described herein (e.g., for authentication of a user 315 engaged in the interactive gameplay session).

Moreover, according to some embodiments, some systems (e.g., some game designers) may proactively pop-up some in game interactive gameplay session specifically for authentication (e.g., such as a mini-game type of quests to users) at some predetermined times or at random times for player authentication. That is, some systems may utilize a first interactive gameplay session within a second interactive gameplay session, where the first gameplay session may be prompted by the system or by the second interactive gameplay session specifically for authentication of the user 315 (e.g., the second interactive gameplay session may be the Esports game or the contest, and the first interactive gameplay session may be a mini-session designed for authentication purposes). In some cases, such interactive gameplay sessions (e.g., mini-games) designed for authentication may include objectives or tasks designed for collection of certain user input attributes (e.g., user input attributes that are suitable or desirable for user authentication purposes). In some cases, players or users 315 may get some reward for finishing such mini-games (e.g., which may be used for collecting more data from users for authentication purpose as well). In some examples, the mini-games may be used to authenticate players, or may be used to collect desirable data for authentication during the live gameplay session or the contest gameplay session.

In some examples, for comparison of user input attributes to the first and second sets of gameplay attributes, the server 320 or device 305 may determine a similarity measurement between the one or more user input attributes and determine if the similarity measurement falls below a threshold. When the similarity measurement is below a similarity threshold, the server 320 or device 305 may determine that the user 315-a is an inauthentic user. When the similarity measurements meets or exceeds a similarity threshold, the server 320 or device 305 may determine that user 315-a is an authentic user. In some cases, the server 320 or device 305 may update the first set of gameplay attributes, the second set of gameplay attributes, or both based on comparing the similarity measurement to the similarity threshold.

In some examples, the user authentication system 300 (e.g., which generally may include the device 305, game 330, game designed, Esports committee, the user 315, etc.) may determine one or more user characteristics (e.g., user rank, frequency of users gameplay, total accumulated time of users gameplay, user reputation, any prior authentication issues or authentication history, etc.) and may determine the similarity threshold (e.g., the threshold of which to contrast the similarity measurement with for authentication purposes) based on the determined user characteristics. As such, the threshold used during the comparison for authentication decisions may, in some cases, be user dependent and may be adaptive over time. Such may result in reduced false detection rates, as the system may further personalize authentication decision making to each user. The user authentication system 300 may thereby support an adaptive user authentication system, and an adaptive user authentication system may reduce account sharing, improve the identification of stolen accounts, and provide continuous user authentication.

In some cases, the server 320 or device 305 may determine whether user 315-a is an authentic user based on a machine learning model. The machine learning model may be trained online and may be dynamically updated, thereby supporting an adaptive user authentication system. In some cases, the machine learning model may adapt as user (e.g., player) behavior changes. For example, the machine learning model may be associated with a feature set that is based on data collected from the sensors of device 305 (e.g., or other sensors of the authentication system 300, as described herein). In some additional or alternative cases, the machine learning model may be associated with a feature set that is based on data (e.g., length of gameplay, gameplay frequency, types of gameplay, etc.) that is associated with a user 315. As the user behavior changes the collected data may change as well, and the machine learning model may be updated based on the changed data. Therefore, the machine learning model may support an adaptive user authentication system, and an adaptive user authentication system may reduce account sharing, identify stolen accounts, and provide continuous user authentication.

In some examples, inputs to the machine learning algorithm may include match outcomes or sensor statistics, or both, for one or more users. In some cases, inputs to the machine learning algorithm may include sensor statistics, and output of the machine learning algorithm may include a predicted user authentication (e.g., whether a user is an authentic user, whether gameplay is authentic gameplay, etc.). For example, the machine learning algorithm may include a model that predicts user authentication based on inputs of sensor statistics (e.g., based on inputting monitored user input attributes). For instance, a machine learning model may be trained using a first set of gameplay attributes associated with a user account and a second set of gameplay attributes associated with inauthentic input. Based on inputting user input attributes, the machine learning model may output an authentication decision (e.g., based on whether the user input attributes more closely match the first or second set of gameplay attributes).

As one example, based on its training, the machine learning algorithm may learn that it takes a player at level 1 (e.g., beginner level) one second (1000 milliseconds) or longer to finish pressing the combination of keys of the keyboard in the particular sequence, that a player at level 2 may press the combination of keys in the particular sequence within 800 to 900 milliseconds, that a player at level 3 may press the combination of keys in the particular sequence within 700 to 800 milliseconds, that a player at level 4 may press the combination of keys in the particular sequence within 600 to 700 milliseconds, that a player at level 5 may press the combination of keys in the particular sequence within 500 to 600 milliseconds, that a player at level n may press the combination of keys in the particular sequence under 200 milliseconds, and so forth. Accordingly, after being trained the machine learning algorithm may predict that a player being monitored (e.g., monitoring sensor statistics of the player in real-time) is likely inauthentic (e.g., a BOT) because the monitoring and analysis of the combination of keys (e.g., among other monitored sensor statistics) indicate that the player presses the combination of keys within 700 to 800 milliseconds. Accordingly, the player may be identified as inauthentic based on the predicted player level and an actual player level (e.g., rank) associated with the player, and the predicted player level may be based at least in part on the analysis of the sensor statistics associated with the machine learning algorithm.

The user authentication system 300 may support continuous, real-time, or pseudo real-time player authentication. For example, user 315-b may the play game 330 as game character 325-b, and user input data may be collected based on sensor data associated with a device 305. In some cases, the user input data may be compared to desirable (e.g., optimal, ideal, etc.) input data on a reoccurring or ongoing basis, and the server 320 may determine whether user 315-b is an authentic user of a user account based on comparing the user input data to the desirable input data. This continuous player authenticate may support the identification of stolen or otherwise inauthentic accounts and improve system security.

Such continuous or frequent measurement or monitoring of user input attributes (e.g., sensor statistics) may leverage a continuous summary of the statistics of each player or user 315. In other words, the continuity of how players are developing their skills of the game may be leveraged for authentication, such that any obvious anomaly samples may be identified (e.g., if the account is not continuously played by the same user). Further, for detecting BOT play, as BOT play may rely on the games software application programming interface (API) directly, the sensory data would be missing entirely (e.g., which would provide for obvious BOT detection due to the lack of sensory input during inauthentic BOT utilization. Further in some cases, account selling/transferring may be strictly forbidden (e.g., in Esports), and certain settings or systems may greatly benefit from such improvements in authentication and security.

Figure 4:
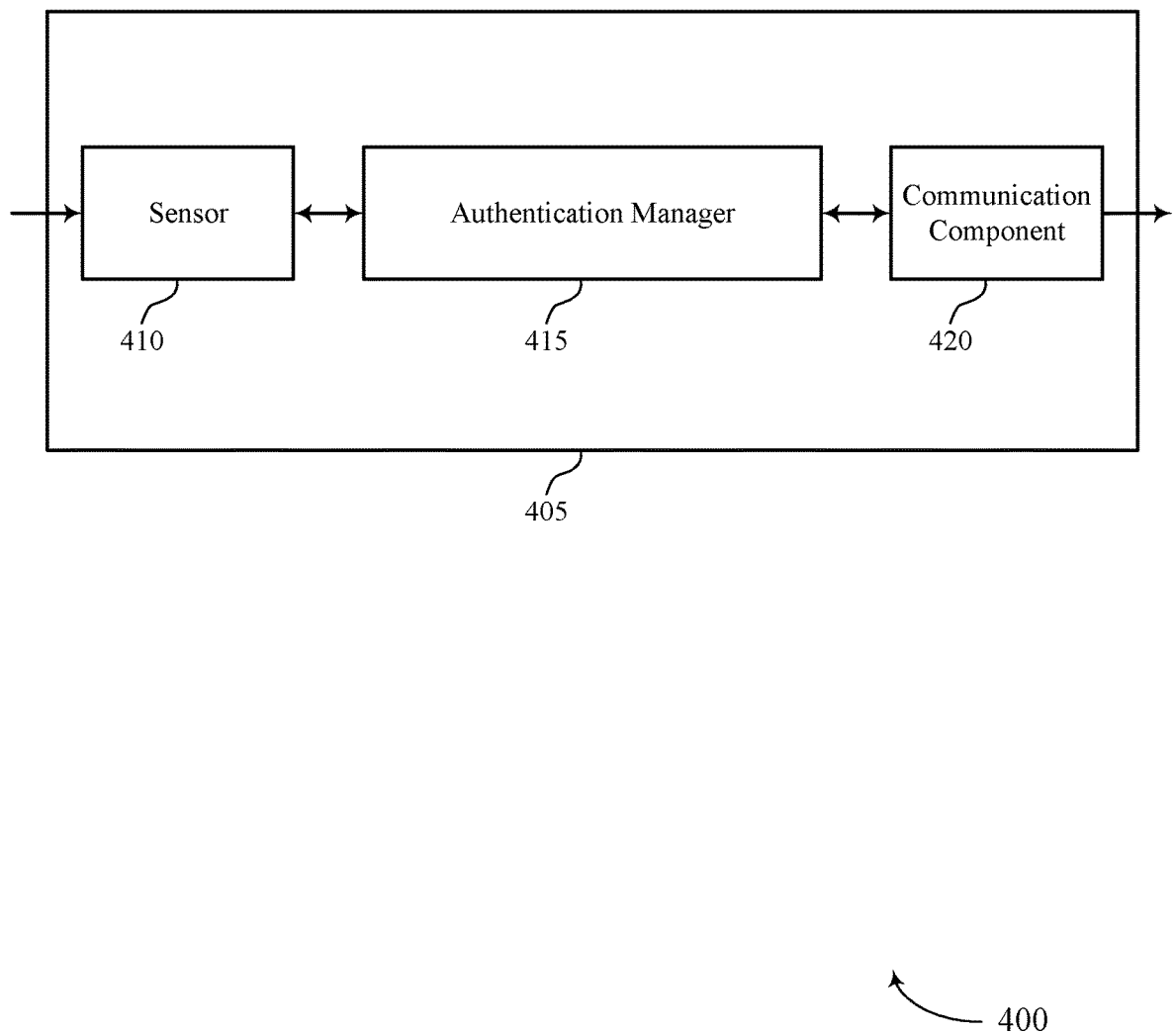
FIGS. 4 and 5 show block diagrams of devices that support using sensor statistics for player authentication in accordance with aspects of the present disclosure.

FIG. 4 shows a block diagram 400 of a device 405 that supports using sensor statistics for player authentication in accordance with aspects of the present disclosure. The device 405 may be an example of aspects of a device as described herein. The device 405 may include a sensor 410, an authentication manager 415, and a communication component 420. The device 405 may also include a processor. Each of these components may be in communication with one another (e.g., via one or more buses).

The one or more sensors 410 (e.g., image sensors, cameras, IMUs, eye trackers, accelerometers, heart rate sensors, etc.) may receive information (e.g., light, force, angular rate, orientation, etc.), which may be passed on to other components of the device 405. In some cases, the sensors 410 may be an example of aspects of the I/O controller 715 described with reference to FIG. 7. A sensor 410 may include or be an example of a sensor for sensing user behavior associated with at least one of a computing device, a peripheral, an input device, a display, a touchscreen, an application running on a computing device, or any combination thereof. A sensor 410 may utilize one or more elements that have a sensitivity to acceleration, mass, electromagnetism, or location to receive information, and the information may then be passed on to other components of the device 405.

The authentication manager 415 may identify a first set of gameplay attributes associated with a user account, identify a second set of gameplay attributes associated with inauthentic input, monitor, via a sensor on an input device, one or more user input attributes of a user during an interactive gameplay session, compare the one or more user input attributes of the user to the first set of gameplay attributes, the second set of gameplay attributes, or both, and determine whether the user is an authentic user of the user account based on the comparison. The authentication manager 415 may be an example of aspects of the authentication manager 710 described herein.

The authentication manager 415, or its sub-components, may be implemented in hardware, code (e.g., software or firmware) executed by a processor, or any combination thereof. If implemented in code executed by a processor, the functions of the authentication manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The authentication manager 415, or its sub-components, may be physically located at various positions, including being distributed such that portions of functions are implemented at different physical locations by one or more physical components. In some examples, the authentication manager 415, or its sub-components, may be a separate and distinct component in accordance with various aspects of the present disclosure. In some examples, the authentication manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communication component 420 may transmit content generated by other components of the device. The communication component 420 may be an example or component of device 305 as described with reference to FIG. 3. In some examples, a communication component 420 may be connected with a buffer which stores data until the data is ready to be read, stored, or transmitted. The communication component 420 may transmit data according to signals or information generated by other components of the device 405. For example, the communication component 420 may receive user input information (e.g., light, heart rate, device motion, device location, eye movement, display adjustments, etc.) from sensor 410, and may transmit the data accordingly. In some cases, the communication component 420 and an I/O controller (e.g., I/O controller 715) may be or represent aspects of a same component of device 405. In some cases, the communication component 420 may be any suitable transmitter, receiver, or transceiver that supports user interaction and/or allowing for receiving and/or transmitting information associated with a user.

Figure 5:
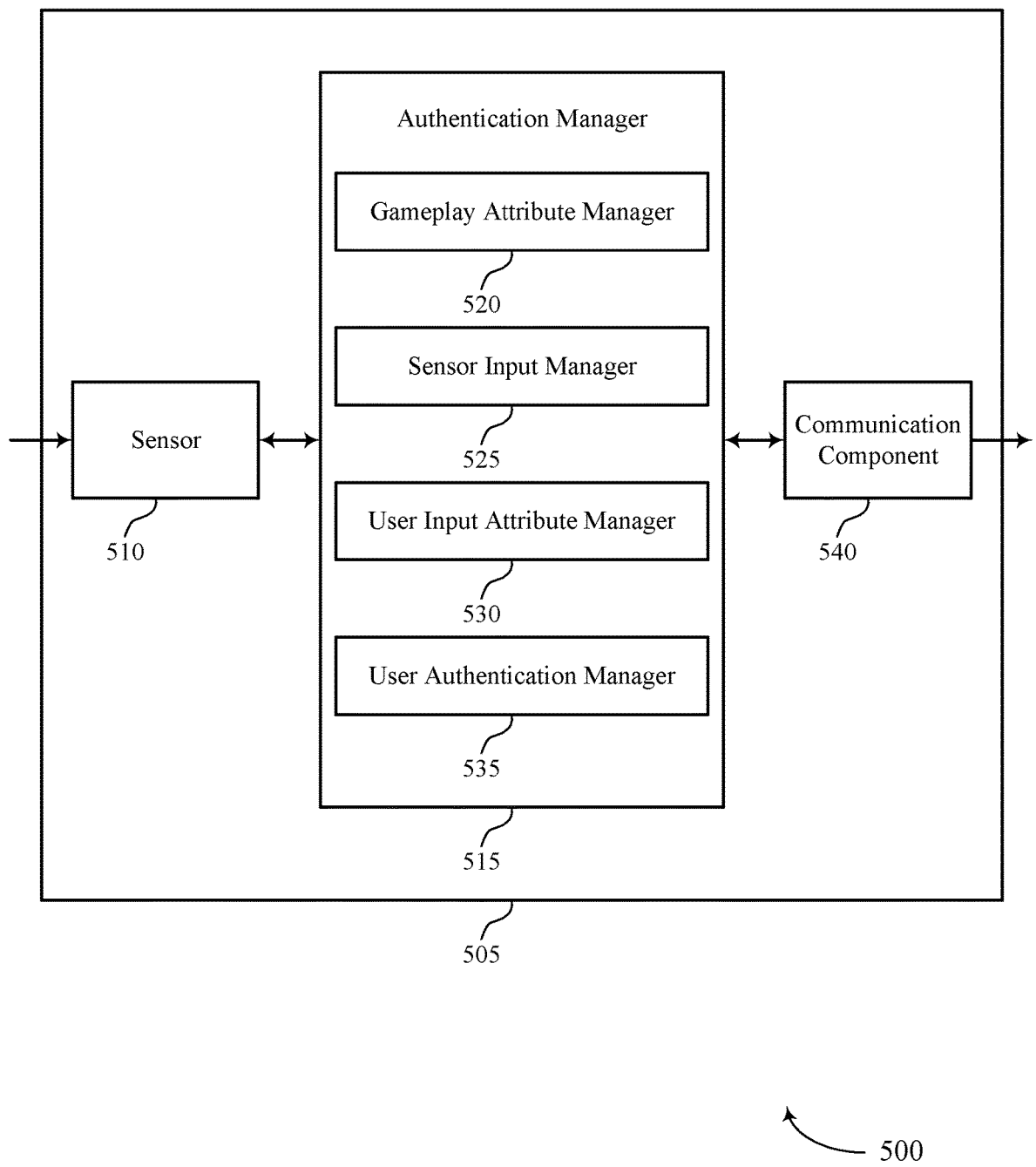

FIG. 5 shows a block diagram 500 of a device 505 that supports using sensor statistics for player authentication in accordance with aspects of the present disclosure. The device 505 may be an example of aspects of a device 405 or a device 105 as described herein. The device 505 may include a sensor 510, an authentication manager 515, and a communication component 540. The device 505 may also include a processor. Each of these components may be in communication with one another (e.g., via one or more buses).

The one or more sensors 510 (e.g., image sensors, IMUs, heart rate sensors, cameras, etc.) may receive information (e.g., light, heart rate, device motion, device location, eye movement, etc.), which may be passed on to other components of the device 505. In some cases, the sensors 510 may be an example of aspects of the I/O controller 715 described with reference to FIG. 7. A sensor 510 may include or be an example of a sensor for sensing user behavior associated with at least one of a computing device, a peripheral, an input device, a display, a touchscreen, an application running on a computing device, or any combination thereof. A sensor 510 may utilize one or more photosensitive elements that have a sensitivity to a spectrum of electromagnetic radiation to receive information (e.g., a sensor 510 may be configured or tuned to receive a pixel intensity value, red green blue (RGB) values, infrared (IR) light values, near-IR light values, ultraviolet (UV) light values of a pixel, etc.). The information may then be passed on to other components of the device 505.

The authentication manager 515 may be an example of aspects of the authentication manager 415 as described herein. The authentication manager 515 may include a gameplay attribute manager 520, a sensor input manager 525, an user input attribute manager 530, and an user authentication manager 535. The authentication manager 515 may be an example of aspects of the authentication manager 710 described herein.

The gameplay attribute manager 520 may identify a first set of gameplay attributes associated with a user account and identify a second set of gameplay attributes associated with inauthentic input. The sensor input manager 525 may monitor, via a sensor on an input device, one or more user input attributes of a user during an interactive gameplay session. The user input attribute manager 530 may compare the one or more user input attributes of the user to the first set of gameplay attributes, the second set of gameplay attributes, or both. The user authentication manager 535 may determine whether the user is an authentic user of the user account based on the comparison.

The communication component 540 may transmit content generated by other components of the device. The communication component 540 may be an example of a communication component 420 as described with reference to FIG. 4. In some examples, communication component 540 may be connected with a buffer which stores data until the data is ready to be read, stored, or transmitted. The communication component 540 may transmit data according to signals or information generated by other components of the device 505. For example, the communication component 540 may receive user input information (e.g., light, heart rate, device motion, device location, eye movement, display adjustments, etc.) from sensor 510, and may transmit the data accordingly. In some cases, the communication component 540 and an I/O controller (e.g., I/O controller 715) may be or represent aspects of a same component of device 505. The communication component 540 may be any suitable transmitter, receiver, or transceiver that supports user interaction and the receiving and/or transmitting of information associated with a user.

Figure 6:
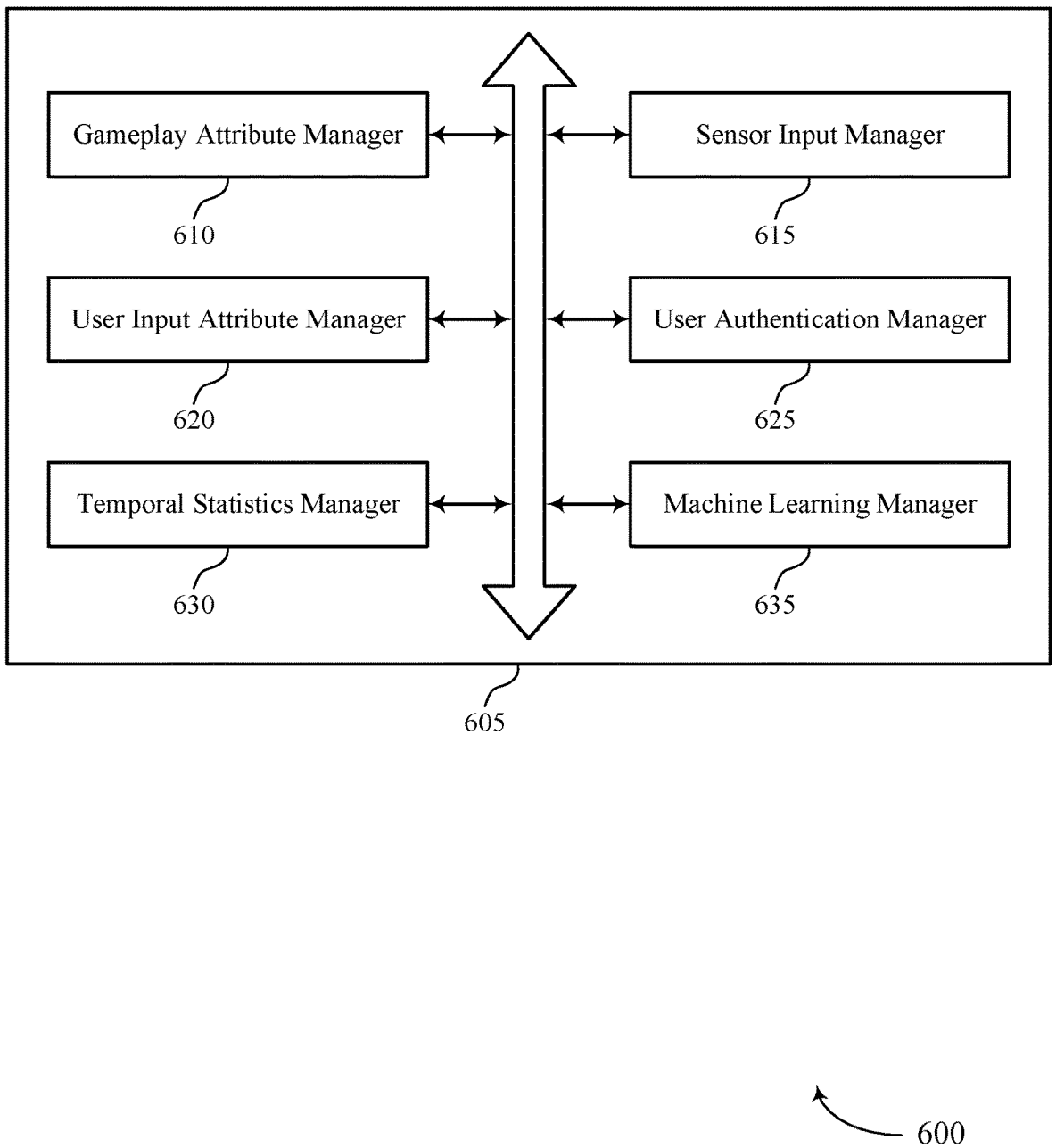
FIG. 6 shows a block diagram of an authentication manager that supports using sensor statistics for player authentication in accordance with aspects of the present disclosure.

FIG. 6 shows a block diagram 600 of an authentication manager 605 that supports using sensor statistics for player authentication in accordance with aspects of the present disclosure. The authentication manager 605 may be an example of aspects of a authentication manager 415, a authentication manager 515, or a authentication manager 710 described herein. The authentication manager 605 may include a gameplay attribute manager 610, a sensor input manager 615, an user input attribute manager 620, an user authentication manager 625, a temporal statistics manager 630, and a machine learning manager 635. Each of these modules may communicate, directly or indirectly, with one another (e.g., via one or more buses).

The gameplay attribute manager 610 may identify a first set of gameplay attributes associated with a user account. In some examples, the gameplay attribute manager 610 may identify a second set of gameplay attributes associated with inauthentic input. In some examples, the gameplay attribute manager 610 may update the first set of gameplay attributes based on the first set of user input attributes.

In some cases, the first set of gameplay attributes is identified based on a second set of one or more user input attributes of the user monitored during a previous interactive gameplay session. In some cases, the first set of gameplay attributes is identified based on a second set of one or more user input attributes associated with a second user of similar player rank to the user.

In some cases, the second set of gameplay attributes is identified based on a set of one or more automated input attributes, one or more bot input attributes, a second set of one or more user input attributes associated with a second user of different player rank than the user, or any combination thereof. In some cases, the second set of gameplay attributes is associated with a bot, a sold account, a transferred account, a second user account, or any combination thereof. In some cases, the inauthentic input includes input associated with a bot, automated input, or input from a second user that is different from the user.

The sensor input manager 615 may monitor, via a sensor on an input device, one or more user input attributes of a user during an interactive gameplay session.

The user input attribute manager 620 may compare the one or more user input attributes of the user to the first set of gameplay attributes, the second set of gameplay attributes, or both. In some examples, the user input attribute manager 620 may determine the user is an inauthentic user of the user account based on matching the one or more user input attributes to at least a subset of the second set of gameplay attributes, where the one or more user input attributes include a monitored reflex time, a monitored eye motion, a monitored heart rate, a monitored gameplay pattern, or any combination thereof. In some cases, the user input attribute manager 620 may determine one or more user characteristics and determine a similarity threshold for the comparison based on the one or more user characteristics, wherein the comparison of the one or more input attributes of the user to the first set of gameplay attributes, the second set of gameplay attributes, or both is based on the similarity threshold.

The user authentication manager 625 may determine whether the user is an authentic user of the user account based on the comparison. In some examples, the user authentication manager 625 may determine the user is the authentic user of the user account based on matching the one or more user input attributes to at least a subset of the first set of gameplay attributes, where the one or more user input attributes include a monitored reflex time, a monitored eye motion, a monitored heart rate, a monitored gameplay pattern, or any combination thereof. In some examples, the user authentication manager 625 may identify at least one user input attribute of the one of the one or more user input attributes differ from the first set of gameplay attributes by a threshold based on the comparison, where the user is determined to be an inauthentic user of the user account based on the identified at least one user input attribute. In some cases, the at least one user input attribute includes a monitored gameplay pattern, a monitored frequency of operation, a monitored player rank, a monitored reflex time, a monitored eye motion, a monitored heart rate, or any combination thereof.

In some cases, the user authentication manager 625 may determine to authenticate the user. In some cases, the user authentication manager 625 may prompt the interactive gameplay session during a second interactive gameplay session based at least in part on the determination to authenticate the user, wherein the interactive gameplay session comprises a gameplay session to authenticate the user for the second interactive gameplay session The temporal statistics manager 630 may monitor, over a time interval, a first set of user input attributes and a second set of user input attributes. In some examples, the temporal statistics manager 630 may identify that the second set of user input attributes differs from the first set of gameplay attributes by a threshold based on the comparison and the time interval, where the user is determined to be an inauthentic user of the user account based on the second set of user input attributes.

The machine learning manager 635 may train a machine learning model based on the first set of gameplay attributes, the second set of gameplay attributes, or both, where the comparison is based on the trained machine learning model. In some examples, the machine learning manager 635 may input the one or more user input attributes in to the trained machine learning model, where the determination of whether the user is the authentic user of the user account is based on an output of the trained machine learning model.

Figure 7:
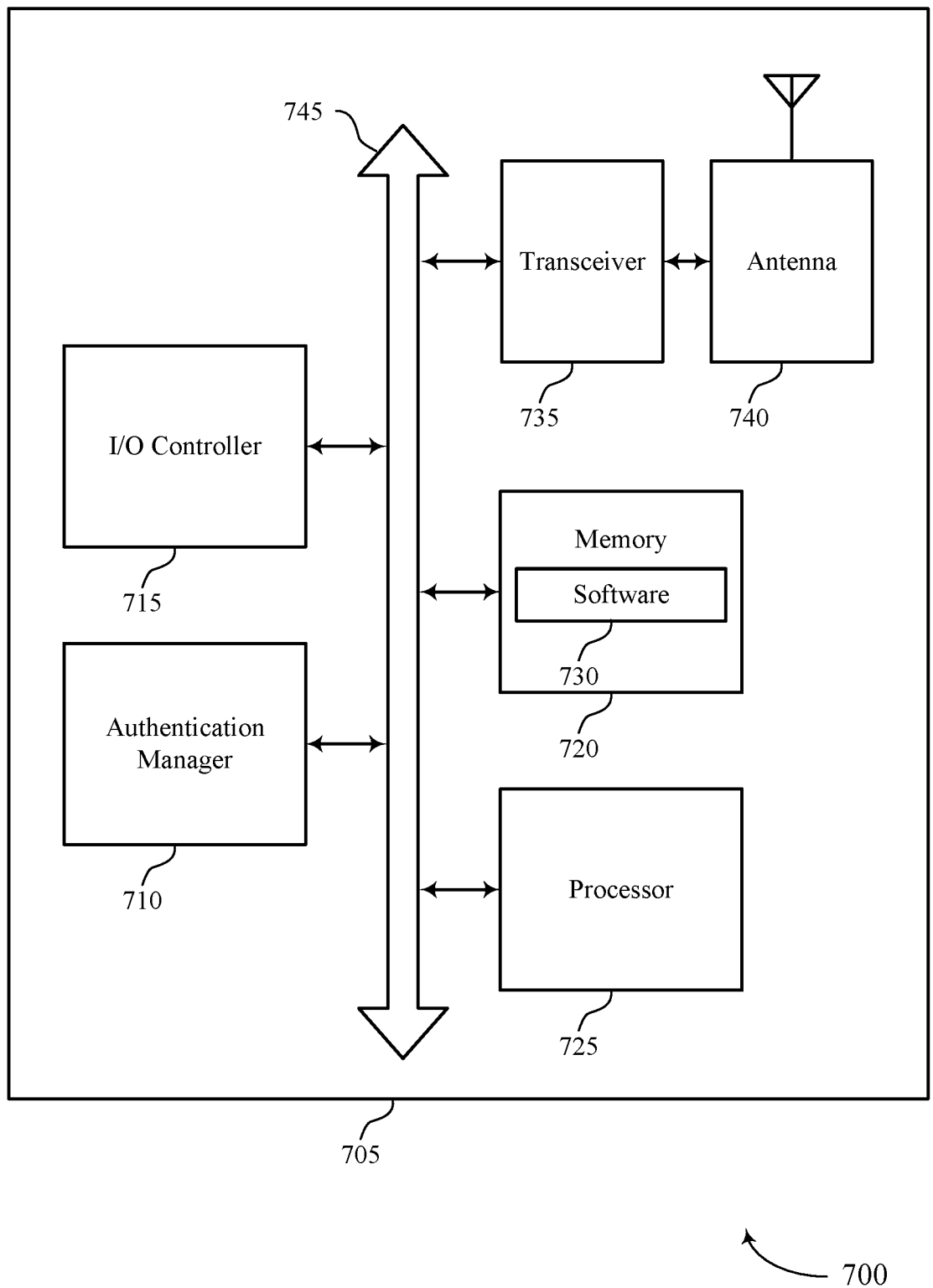
FIG. 7 shows a diagram of a system including a device that supports using sensor statistics for player authentication in accordance with aspects of the present disclosure.

FIG. 7 shows a diagram of a system 700 including a device 705 that supports using sensor statistics for player authentication in accordance with aspects of the present disclosure. The device 705 may be an example of or include the components of device 405, device 505, or a device as described herein. The device 705 may include components for bi-directional voice and data communications including components for transmitting and receiving communications, including an authentication manager 710, an I/O controller 715, memory 720, a processor 725, a transceiver 735, and one or more antennas 740. These components may be in electronic communication via one or more buses (e.g., bus 745).

The authentication manager 710 may identify a first set of gameplay attributes associated with a user account, identify a second set of gameplay attributes associated with inauthentic input, monitor, via a sensor on an input device, one or more user input attributes of a user during an interactive gameplay session, compare the one or more user input attributes of the user to the first set of gameplay attributes, the second set of gameplay attributes, or both, and determine whether the user is an authentic user of the user account based on the comparison.

I/O controller 715 may manage input and output signals for device 705. I/O controller 715 may also manage peripherals not integrated into device 705. In some cases, I/O controller 715 may represent a physical connection or port to an external peripheral. In some cases, I/O controller 715 may utilize an operating system such as iOS®, ANDROID®, MS-DOS®, MS-WINDOWS®, OS/2®, UNIX®, LINUX®, or another known operating system. In other cases, I/O controller 715 may represent or interact with a modem, a keyboard, a mouse, a touchscreen, or a similar device. In some cases, I/O controller 715 may be implemented as part of a processor. In some cases, a user may interact with device 705 via I/O controller 715 or via hardware components controlled by I/O controller 715.

The memory 720 may include RAM and ROM. The memory 720 may store computer-readable, computer-executable code or software 730 including instructions that, when executed, cause the processor to perform various functions described herein. In some cases, the memory 720 may contain, among other things, a BIOS which may control basic hardware or software operation such as the interaction with peripheral components or devices.

The processor 725 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 725 may be configured to operate a memory array using a memory controller. In other cases, a memory controller may be integrated into the processor 725. The processor 725 may be configured to execute computer-readable instructions stored in a memory (e.g., the memory 720) to cause the device 705 to perform various functions (e.g., functions or tasks supporting using sensor statistics for player authentication).

The software 730 may include instructions to implement aspects of the present disclosure, including instructions to support user authentication. The software 730 may be stored in a non-transitory computer-readable medium such as system memory or other type of memory. In some cases, the software 730 may not be directly executable by the processor 725 but may cause a computer (e.g., when compiled and executed) to perform functions described herein.

The transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the device may include a single antenna 740. However, in some cases the device may have more than one antenna 740, which may be capable of concurrently transmitting or receiving multiple wireless transmissions.

Figure 8:
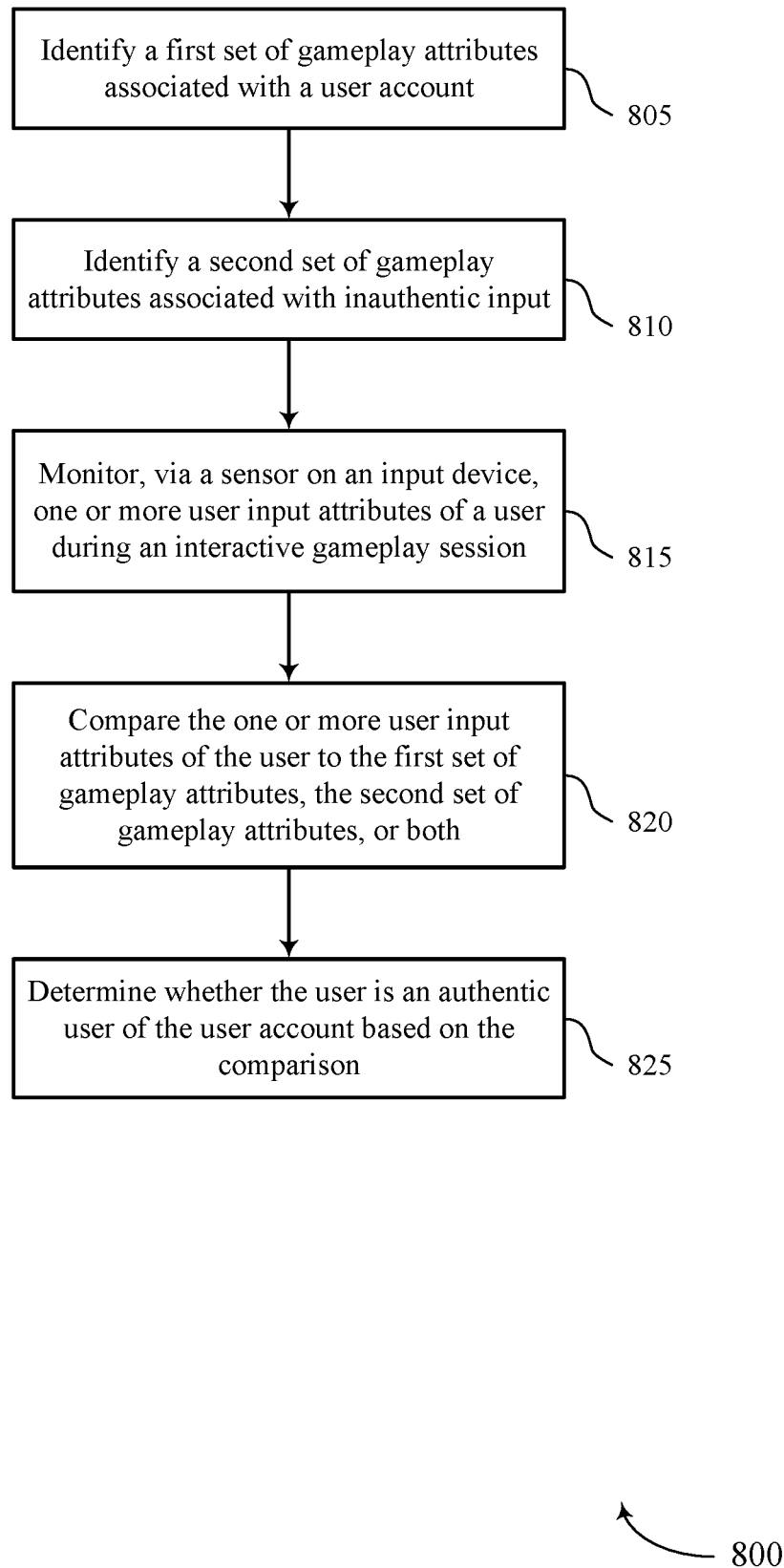
FIGS. 8 through 10 show flowcharts illustrating methods that support using sensor statistics for player authentication in accordance with aspects of the present disclosure.

FIG. 8 shows a flowchart illustrating a method 800 that supports using sensor statistics for player authentication in accordance with aspects of the present disclosure. The operations of method 800 may be implemented by a device or its components as described herein. For example, the operations of method 800 may be performed by a authentication manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 805, the device may identify a first set of gameplay attributes associated with a user account. The operations of 805 may be performed according to the methods described herein. In some examples, aspects of the operations of 805 may be performed by a gameplay attribute manager as described with reference to FIGS. 4 through 7.

At 810, the device may identify a second set of gameplay attributes associated with inauthentic input. The operations of 810 may be performed according to the methods described herein. In some examples, aspects of the operations of 810 may be performed by a gameplay attribute manager as described with reference to FIGS. 4 through 7.

At 815, the device may monitor, via a sensor on an input device, one or more user input attributes of a user during an interactive gameplay session. The operations of 815 may be performed according to the methods described herein. In some examples, aspects of the operations of 815 may be performed by a sensor input manager as described with reference to FIGS. 4 through 7.

At 820, the device may compare the one or more user input attributes of the user to the first set of gameplay attributes, the second set of gameplay attributes, or both. The operations of 820 may be performed according to the methods described herein. In some examples, aspects of the operations of 820 may be performed by an user input attribute manager as described with reference to FIGS. 4 through 7.

At 825, the device may determine whether the user is an authentic user of the user account based on the comparison. The operations of 825 may be performed according to the methods described herein. In some examples, aspects of the operations of 825 may be performed by an user authentication manager as described with reference to FIGS. 4 through 7.

Figure 9:
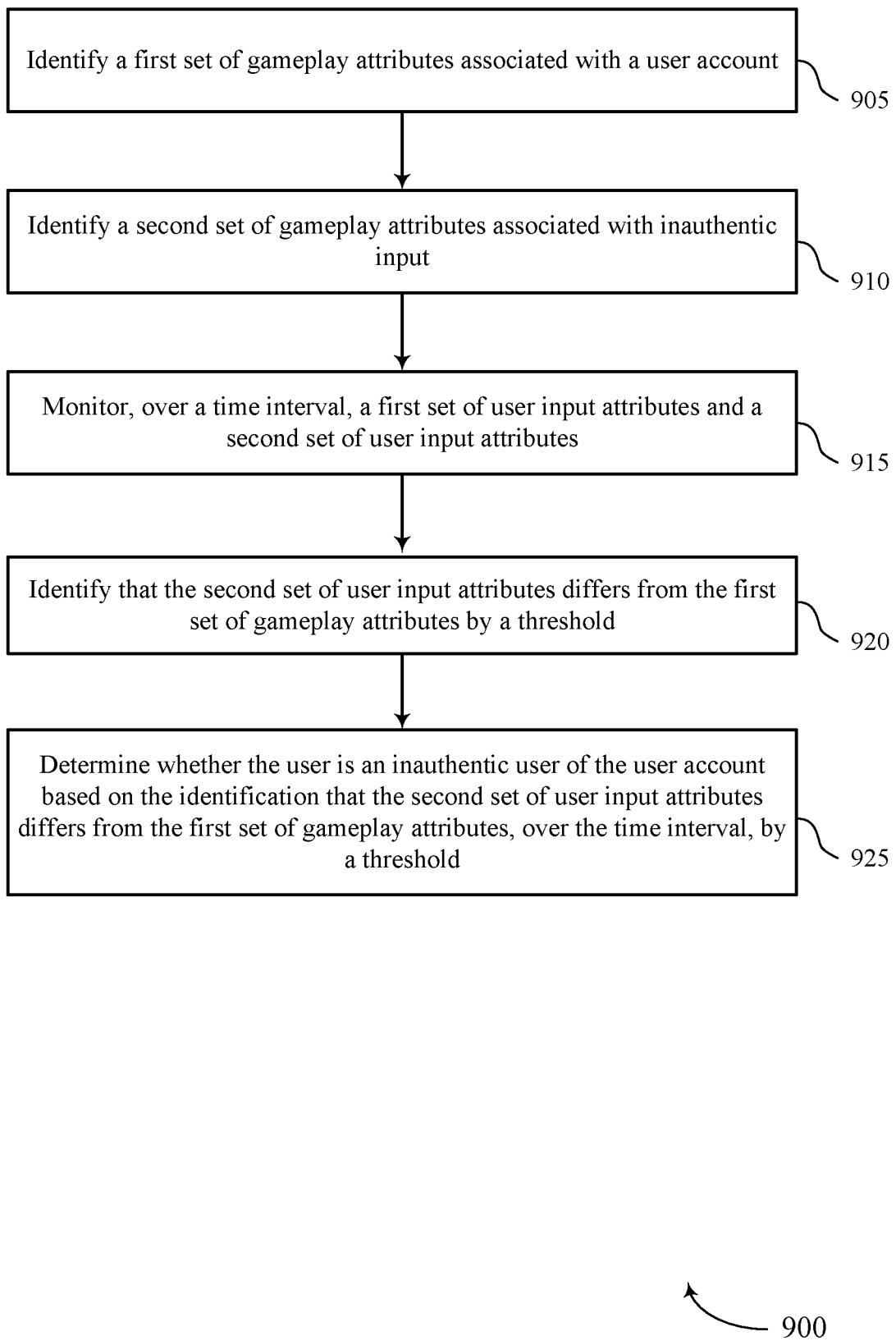

FIG. 9 shows a flowchart illustrating a method 900 that supports using sensor statistics for player authentication in accordance with aspects of the present disclosure. The operations of method 900 may be implemented by a device or its components as described herein. For example, the operations of method 900 may be performed by a authentication manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 905, the device may identify a first set of gameplay attributes associated with a user account. The operations of 905 may be performed according to the methods described herein. In some examples, aspects of the operations of 905 may be performed by a gameplay attribute manager as described with reference to FIGS. 4 through 7.

At 910, the device may identify a second set of gameplay attributes associated with inauthentic input. The operations of 910 may be performed according to the methods described herein. In some examples, aspects of the operations of 910 may be performed by a gameplay attribute manager as described with reference to FIGS. 4 through 7.

At 915, the device may monitor, over a time interval, a first set of user input attributes and a second set of user input attributes. In some cases, the device may update the first set of gameplay attributes based on the first set of user input attributes. The operations of 915 may be performed according to the methods described herein. In some examples, aspects of the operations of 915 may be performed by a temporal statistics manager as described with reference to FIGS. 4 through 7.

At 920, the device may identify that the second set of user input attributes differs from the first set of gameplay attributes, over the time interval, by a threshold. For example, the device may compare the one or more user input attributes of the user to the first set of gameplay attributes, the second set of gameplay attributes, or both. Based on the comparison and the time interval, the device may identify that the second set of user input attributes differs from the first set of gameplay attributes by a threshold (e.g., which may indicate spiky behavior, rapid level increase, inauthentic user gameplay, etc.). The operations of 920 may be performed according to the methods described herein. In some examples, aspects of the operations of 920 may be performed by a temporal statistics manager as described with reference to FIGS. 4 through 7.

At 925, the device may determine that the user is an inauthentic user of the user account based on the second set of user input attributes differing from the first set of gameplay attributes over the time interval. The operations of 925 may be performed according to the methods described herein. In some examples, aspects of the operations of 925 may be performed by an user authentication manager as described with reference to FIGS. 4 through 7.

Figure 10:
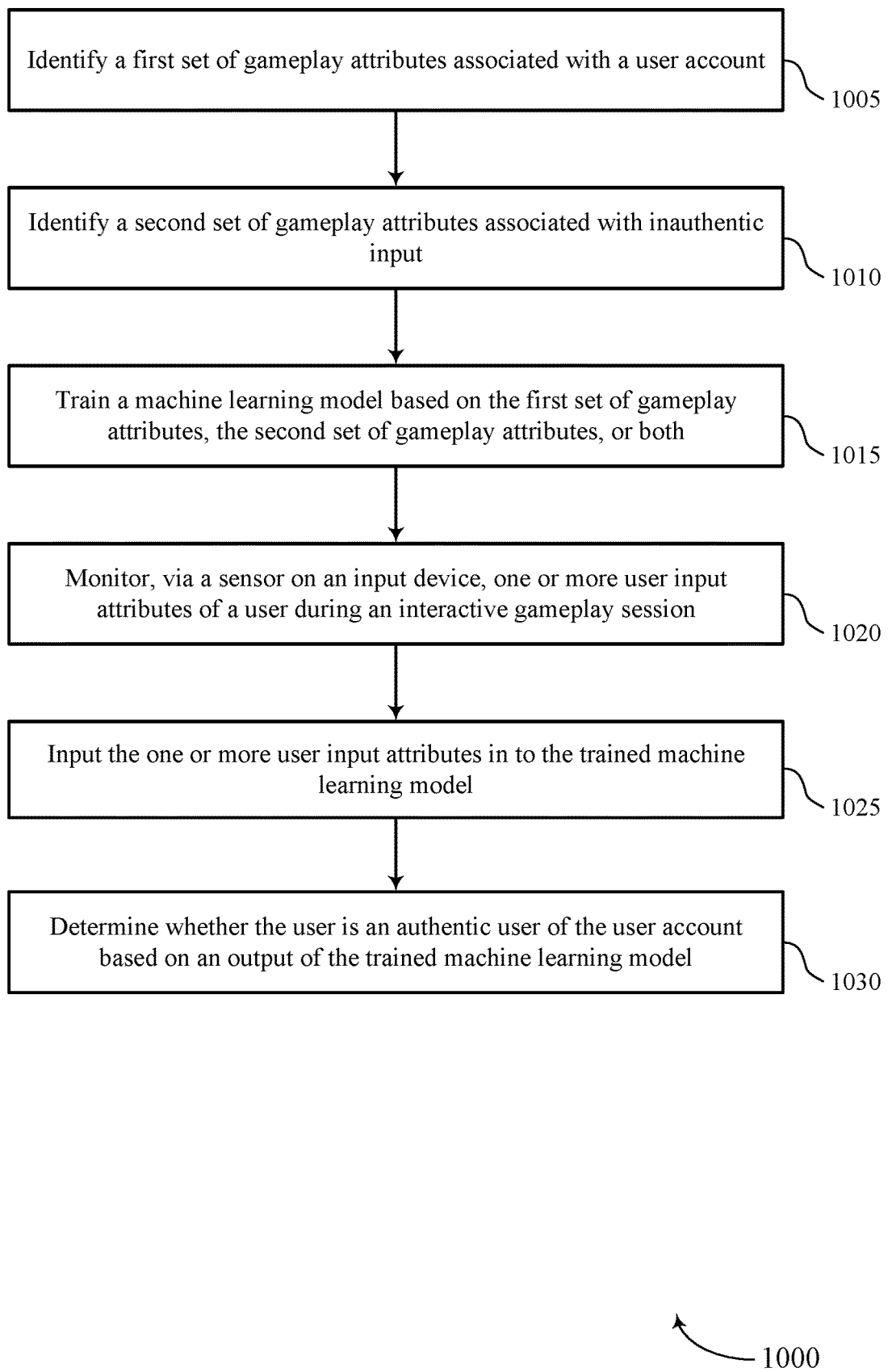

FIG. 10 shows a flowchart illustrating a method 1000 that supports using sensor statistics for player authentication in accordance with aspects of the present disclosure. The operations of method 1000 may be implemented by a device or its components as described herein. For example, the operations of method 1000 may be performed by a authentication manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1005, the device may identify a first set of gameplay attributes associated with a user account. The operations of 1005 may be performed according to the methods described herein. In some examples, aspects of the operations of 1005 may be performed by a gameplay attribute manager as described with reference to FIGS. 4 through 7.

At 1010, the device may identify a second set of gameplay attributes associated with inauthentic input. The operations of 1010 may be performed according to the methods described herein. In some examples, aspects of the operations of 1010 may be performed by a gameplay attribute manager as described with reference to FIGS. 4 through 7.

At 1015, the device may train a machine learning model based on the first set of gameplay attributes, the second set of gameplay attributes, or both. The operations of 1015 may be performed according to the methods described herein. In some examples, aspects of the operations of 1015 may be performed by a machine learning manager as described with reference to FIGS. 4 through 7.

At 1020, the device may monitor, via a sensor on an input device, one or more user input attributes of a user during an interactive gameplay session. The operations of 1020 may be performed according to the methods described herein. In some examples, aspects of the operations of 1020 may be performed by a sensor input manager as described with reference to FIGS. 4 through 7.

At 1025, the device may input the one or more user input attributes into the trained machine learning model. The operations of 1025 may be performed according to the methods described herein. In some examples, aspects of the operations of 1025 may be performed by a machine learning manager as described with reference to FIGS. 4 through 7.

At 1030, the device may determine whether the user is an authentic user of the user account based on an output of the trained machine learning model. The operations of 1030 may be performed according to the methods described herein. In some examples, aspects of the operations of 1030 may be performed by an user authentication manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for user authentication, comprising:
   identifying a first set of gameplay attributes associated with a user account;
   identifying a second set of gameplay attributes associated with inauthentic input;
   monitoring, via a sensor on an input device, one or more user input attributes of a user during an interactive game play session;
   comparing the one or more user input attributes of the user to the first set of game play attributes, the second set of game play attributes, or both; and
   determining whether the user is an authentic user of the user account based at least in part on the comparison;
   wherein the first set of gameplay attributes is identified based at least in part on a second set of one or more user input attributes associated with a second user of similar player rank to the user.

2. The method of claim 1, wherein determining whether the user is the authentic user of the user account comprises:
   determining the user is the authentic user of the user account based at least in part on matching the one or more user input attributes to at least a subset of the first set of game play attributes, wherein the one or more user input attributes comprise a monitored reflex time, a monitored eye motion, a monitored heart rate, a monitored gameplay pattern, or any combination thereof.

3. The method of claim 1, wherein determining whether the user is the authentic user of the user account comprises:
   determining the user is an inauthentic user of the user account based at least in part on matching the one or more user input attributes to at least a subset of the second set of game play attributes, wherein the one or more user input attributes comprise a monitored reflex time, a monitored eye motion, a monitored heart rate, a monitored game play pattern, or any combination thereof.

4. The method of claim 1, further comprising:
   identifying at least one user input attribute of the one of the one or more user input attributes differ from the first set of gameplay attributes by a threshold based at least in part on the comparison, wherein the user is determined to bean inauthentic user of the user account based at least in part on the identified at least one user input attribute.

5. The method of claim 4, wherein the at least one user input attribute comprises a monitored game play pattern, a monitored frequency of operation, a monitored player rank, a monitored reflex time, a monitored eye motion, a monitored heart rate, or any combination thereof.

6. The method of claim 1, wherein monitoring the one or more user input attributes comprises:
monitoring, over a time interval, a first set of user input attributes and a second set of user input attributes.

7. The method of claim 6, further comprising:
updating the first set of game play attributes based at least in part on the first set of user input attributes; and
identifying that the second set of user in put attributes differs from the first set of gameplay attributes by a threshold based at least in part on the comparison and the time interval, wherein the user is determined to be an inauthentic user of the user account based at least in part on the second set of user input attributes.

8. The method of claim 1, further comprising:
training a machine learning model based at least in part on the first set of gameplay attributes, the second set of gameplay attributes, or both, wherein the comparison is based at least in part on the trained machine learning model.

9. The method of claim 8, wherein comparing the one or more user input attributes to the first set of gameplay attributes, the second set of gameplay attributes, or both comprises:
inputting the one or more user input attributes into the trained machine learning model, wherein the determination of whether the user is the authentic user of the user account is based at least in part on an output of the trained machine learning model.

10. The method of claim 1, wherein the first set of gameplay attributes is identified based at least in part on a second set of one or more user input attributes of the user monitored during a previous interactive gameplay session.

11. The method of claim 1, wherein the second set of gameplay attributes is identified based at least in part on a set of one or more automated input attributes, one or more bot input attributes, a second set of one or more user input attributes associated with a second user of different player rank than the user, or any combination thereof.

12. The method of claim 1, wherein the second set of gameplay attributes is associated with a bot, a sold account, a transferred account, a second user account, or any combination thereof.

13. The method of claim 1, wherein the inauthentic input comprises input associated with a bot, automated input, or input from a second user that is different from the user.

14. The method of claim 1, further comprising:
determining to authenticate the user; and
prompting the interactive game play session during a second interactive game play session based at least in part on the determination to authenticate the user, wherein the interactive game play session comprises a game play session to authenticate the user for the second interactive game play session.

15. The method of claim 1, further comprising:
determining one or more user characteristics; and
determining a similarity threshold for the comparison based at least in part on the one or more user characteristics, wherein the comparison of the one or more input attributes of the user to the first set of game play attributes, the second set of game play attributes, or both is based at least in part on the similarity threshold.

16. An apparatus for user authentication, comprising:
a processor,
memory coupled with the processor; and
instructions stored in the memory and executable by the processor to cause the apparatus to:
identify a first set of gameplay attributes associated with a user account;
identify a second set of gameplay attributes associated with inauthentic input;
monitor, via a sensor on an input device, one or more user input attributes of a user during an interactive game play session;
compare the one or more user input attributes of the user to the first set of gameplay attributes, the second set of game play attributes, or both; and
determine whether the user is an authentic user of the user account based at least in part on the comparison;
wherein the first set of gameplay attributes is identified based at least in part on a second set of one or more user input attributes associated with a second user of similar player rank to the user.

17. The apparatus of claim 16, wherein the instructions to determine whether the user is the authentic user of the user account are executable by the processor to cause the apparatus to:
determine the user is the authentic user of the user account based at least in part on matching the one or more user input attributes to at least a subset of the first set of gameplay attributes, wherein the one or more user input attributes comprise a monitored reflex time, a monitored eye motion, a monitored heart rate, a monitored gameplay pattern, or any combination thereof.

18. The apparatus of claim 16, wherein the instructions to determine whether the user is the authentic user of the user account are executable by the processor to cause the apparatus to:
determine the user is an inauthentic user of the user account based at least in part on matching the one or more user input attributes to at least a subset of the second set of game play attributes, wherein the one or more user input attributes comprise a monitored reflex time, a monitored eye motion, a monitored heart rate, a monitored game play pattern, or any combination thereof.

19. An apparatus for user authentication, comprising:
means for identifying a first set of gameplay attributes associated with a user account;
means for identifying a second set of gameplay attributes associated with inauthentic input;
means for monitoring, via a sensor on an input device, one or more user input attributes of a user during an interactive gameplay session;
means for comparing the one or more user input attributes of the user to the first set of gameplay attributes, the second set of game play attributes, or both; and
means for determining whether the user is an authentic user of the user account based at least in part on the comparison;
wherein the first set of gameplay attributes is identified based at least in part on a second set of one or more user input attributes associated with a second user of similar player rank to the user.

* * * * *